(12) United States Patent
Lachermeier

(10) Patent No.: US 10,065,845 B2
(45) Date of Patent: Sep. 4, 2018

(54) TRANSLATING TREATMENT CARTRIDGE, FLUID DISPENSING SYSTEM, AND METHOD OF USING

(71) Applicant: 3M INNOVATIVE PROPERTIES COMPANY, St. Paul, MN (US)

(72) Inventor: David W. Lachermeier, Chaska, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 40 days.

(21) Appl. No.: 15/209,304

(22) Filed: Jul. 13, 2016

(65) Prior Publication Data

US 2017/0015543 A1    Jan. 19, 2017

Related U.S. Application Data

(60) Provisional application No. 62/191,724, filed on Jul. 13, 2015.

(51) Int. Cl.
| | |
|---|---|
| *B67D 7/76* | (2010.01) |
| *B67D 1/00* | (2006.01) |
| *F16K 11/07* | (2006.01) |
| *B01D 35/153* | (2006.01) |
| *C02F 1/00* | (2006.01) |

(52) U.S. Cl.
CPC ......... *B67D 1/0082* (2013.01); *B67D 1/0003* (2013.01); *B67D 1/0014* (2013.01); *F16K 11/0716* (2013.01); *B01D 35/153* (2013.01); *B67D 2001/0089* (2013.01); *B67D 2001/0093* (2013.01); *B67D 2210/0001* (2013.01); *C02F 1/003* (2013.01); *C02F 2201/004* (2013.01); *C02F 2201/005* (2013.01); *C02F 2201/006* (2013.01); *C02F 2307/10* (2013.01); *C02F 2307/12* (2013.01)

(58) Field of Classification Search
CPC .... B01D 29/96; B67D 1/0082; B67D 1/0003; B67D 1/0014; B67D 2001/0093; B67D 2210/0001; F61K 11/0716
USPC .......... 222/189.06–189.08, 189.11; 210/203, 210/232–236, 238, 240
See application file for complete search history.

(56) References Cited

U.S. PATENT DOCUMENTS

| | | | |
|---|---|---|---|
| 2,238,449 A | | 4/1941 | Peters |
| 3,472,380 A | * | 10/1969 | Rosaen ................ B01D 29/114 116/328 |
| 4,591,438 A | * | 5/1986 | Tanabe ................ B01D 35/043 210/282 |
| 5,095,572 A | | 3/1992 | Wagner |
| 5,503,179 A | | 4/1996 | Till |
| | | | (Continued) |

FOREIGN PATENT DOCUMENTS

WO    WO 2007/126047    11/2007

*Primary Examiner* — Lien Ngo
(74) *Attorney, Agent, or Firm* — Scott A. Baum

(57) ABSTRACT

A dispensing system having a treatment cartridge utilizing linear translation of the treatment cartridge within the manifold to actuate a valve to dispense a fluid. To dispense the fluid, a person pushes their glass or other container against a dispensing lever that translates the treatment cartridge within the manifold causing a cam surface on the filter's circumferential exterior to actuate a valve sending the fluid from the valve though the treatment cartridge and out a dispensing orifice in the treatment cartridge into the glass.

24 Claims, 17 Drawing Sheets

(56) References Cited

U.S. PATENT DOCUMENTS

| | | | |
|---|---|---|---|
| 6,871,675 B1 | 3/2005 | Marszalec | |
| 7,060,184 B2* | 6/2006 | Cline | B01D 35/147 |
| | | | 210/248 |
| 8,496,823 B2* | 7/2013 | Cur | F25D 23/126 |
| | | | 210/175 |
| 8,511,107 B2 | 8/2013 | An | |
| 8,550,302 B1 | 10/2013 | Laible | |
| 8,678,048 B2 | 3/2014 | Buchik | |
| 2006/0191827 A1 | 8/2006 | Fritze | |
| 2008/0047889 A1 | 2/2008 | Huda | |
| 2009/0126392 A1 | 4/2009 | An | |
| 2011/0174705 A1* | 7/2011 | Branscomb | B01D 35/153 |
| | | | 210/153 |
| 2011/0185762 A1* | 8/2011 | Kruckenberg | B23P 19/04 |
| | | | 62/389 |
| 2012/0042677 A1 | 2/2012 | Mitchell | |
| 2012/0210740 A1 | 8/2012 | Kim | |
| 2013/0334450 A1 | 12/2013 | Proulx et al. | |

* cited by examiner

TRANSLATING TREATMENT CARTRIDGE, FLUID DISPENSING SYSTEM, AND METHOD OF USING

CROSS REFERENCE TO RELATED APPLICATIONS

This application claims the benefit of U.S. Provisional Patent Application No. 62/191,724, filed Jul. 13, 2015, the disclosure of which is incorporated by reference in its entirety herein.

BACKGROUND

Disposable, single use, treatment cartridges having a rigid plastic exterior shell containing a treatment media for filtering or treating drinking water dispensed from a refrigerator door come in a wide variety of sizes and styles. Generally, the treatment cartridges are installed into a corresponding manifold located on an interior portion of the refrigerator. Once installed, the treatment cartridge remains in a fixed position and an electrical contact operating a solenoid actuating a water supply valve is used to dispense drinking water into a glass when depressing the electrical contact completing the circuit.

SUMMARY

Placing the water manifold deep inside of the refrigerator and using an electrical contact and solenoid for dispensing filtered water has several disadvantages. First, there is the inherent cost of providing the electromechanical components (solenoid and contact) as opposed to a purely mechanically actuated valve. Second, various locations inside of the refrigerator, especially close to the freezer compartment, can be too cold and actually freeze the water in the treatment cartridge thereby causing it to crack and leak water within the home potentially causing water damage. Lastly, once the treatment cartridge is installed in the manifold it is under constant line pressure from the water supply source becoming a small pressure vessel. This requires that the treatment cartridge be designed in a more costly manner to withstand the continuous applied supply pressure.

Thus, what is needed is a simplified system to dispense filtered fluids; especially, filtered water from a dispensing system co-located within a conventional home refrigerator. The inventor has determined that by designing the treatment cartridge such that linear translation of the treatment cartridge actuates a valve thereby dispensing the water solves the above problems and provides additional advantages. In essence, the treatment cartridge acts as a "spool valve" within the manifold such that linear translation of the treatment cartridge turns on and off the flow of water and directs the water to the appropriate outlet. To dispense the water, a consumer in one embodiment pushes their glass against a handle or dispensing lever that translates the treatment cartridge within the manifold causing a cam surface on the filter's circumferential exterior to actuate a poppet valve sending water from the poppet valve though the filter and out into the glass.

Since the treatment cartridge is no longer under any significant pressure in operation as the dispensing orifice is open to atmospheric pressure, it can be made from thinner materials. Since the treatment cartridge by use of linear translation actuates the water shutoff valve, the electrical contact and solenoid actuated valve of prior systems can be eliminated in some embodiments. Lastly, since the treatment cartridge has an integrated dispensing orifice it can be positioned so it is accessible from the refrigerators' exterior eliminating possible freezing conditions and making the treatment cartridge more convenient to change.

Hence in one embodiment the invention resides in a dispensing system comprising: a manifold having a fluid inlet and a cartridge bore; a translating treatment cartridge in the cartridge bore; and wherein motion of the translating treatment cartridge from a first position to a dispensing position within the cartridge bore dispenses fluid from a dispensing orifice located in the translating treatment cartridge.

In another embodiment, the invention resides in a method of dispensing a fluid comprising: positioning a translating treatment cartridge having a housing with an inlet orifice and a dispensing orifice into a manifold, the manifold having a cartridge bore surrounding a central axis of the manifold and a fluid inlet; moving the translating treatment cartridge linearly along the central axis from a first position to a dispensing position causing the fluid to flow from the fluid inlet, though the inlet orifice, through the translating treatment cartridge, and out the dispensing orifice.

In another embodiment the invention resides in a translating treatment cartridge comprising: a housing having a first end, a second end, a central axis extending from the first end to the second end, a first body portion surrounding the central axis, a second body portion surrounding the central axis, and a cam surface located on the housing; the first body portion having a larger cross sectional area than the second body portion; a cartridge inlet orifice located in the first body portion or the second body portion; a treatment media contained within the housing; and a dispensing orifice located in the housing.

Definition

A translating treatment cartridge means a fluid treatment device having a treatment media or device contained within a housing having an inlet orifice and a dispensing orifice with the treatment media disposed in the flow path between the inlet orifice and the dispending orifice. When used in a cartridge bore of a compatible manifold, motion of the translating treatment cartridge within the cartridge bore between a first position and a dispensing position starts and stops the flow of fluid from the dispensing orifice.

DETAILED DESCRIPTION

Referring now to FIGS. 1-6, a first embodiment of a dispensing system 10 is illustrated. While the dispensing system can be used in a refrigerator, such as locating it in the door of the refrigerator, it is useful for other applications such as water coolers, countertop dispensing systems, or other intermittent fluid dispensing systems. In many applications water is the fluid being treated, but the dispensing system can be used to treat any fluid that needs intermittent dispensing.

Figure 2:
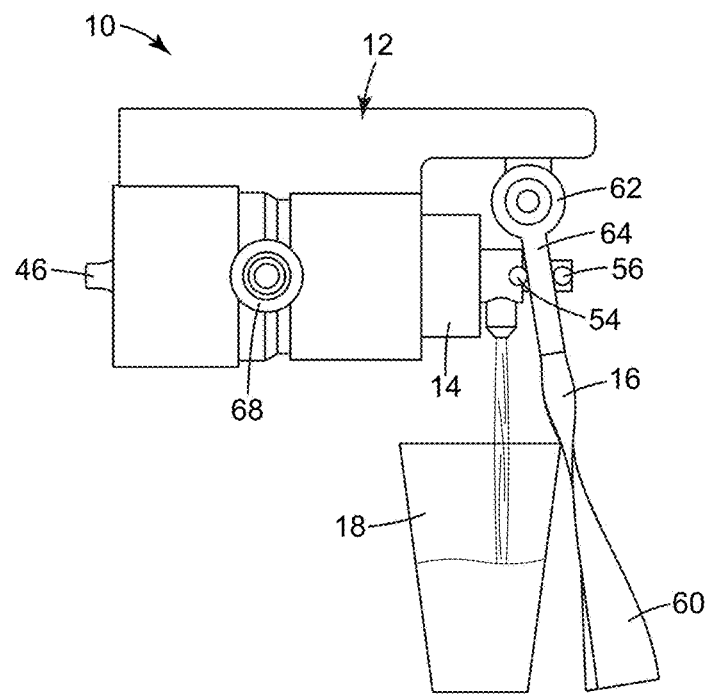
FIG. 2 illustrates the fluid dispensing system dispensing water into a drinking glass.

The main components of the dispensing system include a manifold 12, a translating treatment cartridge 14, and an optional dispensing lever 16. As best seen in FIG. 2, placing a glass 18 under the translating treatment cartridge 14 and pushing the dispensing lever 16 to the right slides the translating treatment cartridge linearly within the manifold 12 causing a cam surface on the treatment cartridge's exterior to actuate a poppet valve sending water from the poppet valve though the treatment cartridge, out the integrated dispensing orifice, and into the glass. In some embodiments, due to differential areas selected for the pressurized exterior portion of the translating filter cartridge, the hydraulic pressure can provide a restoring force tending to move the cartridge back towards its starting position and shut off the fluid flow in the absence of any force on the dispensing lever.

Figure 5:
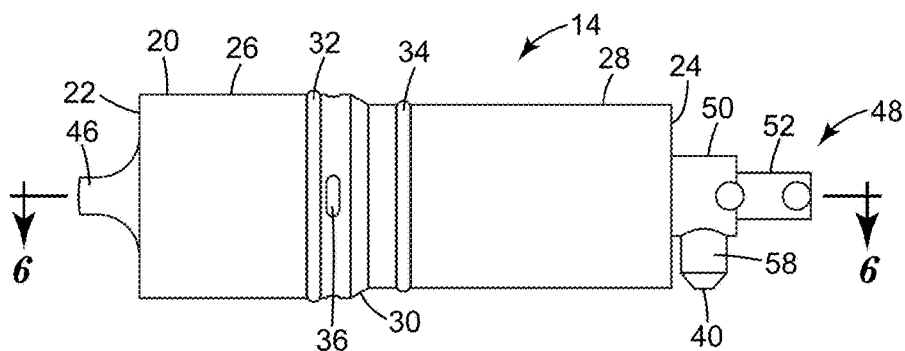
FIG. 5 illustrates a side view of the treatment cartridge.
Figure 6:
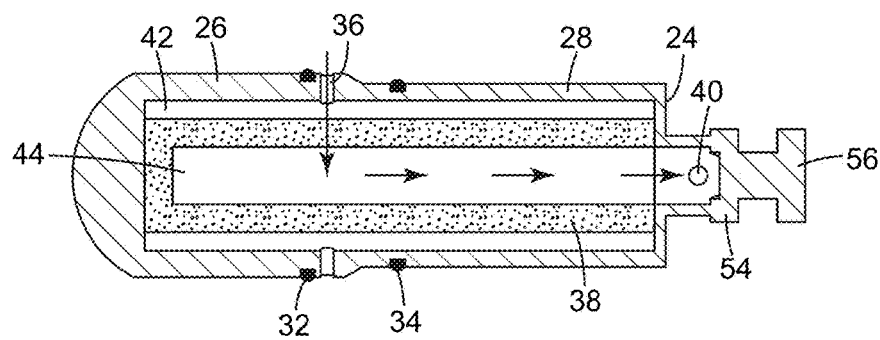
FIG. 6 illustrates a cross section of the treatment cartridge taken at 6-6 of FIG. 5.

Referring now to FIGS. 5 and 6, the translating treatment cartridge 14 includes a housing 20 having a first end 22, a second end 24, a first body portion 26, a second body portion 28, and a cam surface 30 located between the first and second body portions. In various embodiments, the cam surface 30 is located within the middle half of the translating treatment cartridge's overall length. In various embodiments, the cam surface can be formed on an annular ring or on the perimeter of the housing. In various embodiments a chamfer can be used. In other embodiments a discrete ramp or tapered projection can be used. In other embodiments, the cam/ramp/inclined surface can be arcuate, linear, a portion of the housing 20, a projection on the housing 20, an extrusion or protrusion, a bump or series of bumps, or a gradual increase in circumference or diameter.

In some embodiments, a first sealing member 32 is located on the first body portion 26 nearer the cam surface 30 than the first end 22 and a second sealing member 34 is located on the second body portion 28 nearer the cam surface 30 than the second end 24. In other embodiments, the sealing members are provided in the manifold 12 and the exterior surface of the housing engages the seals while allowing for translation of the treatment cartridge. In various embodiments, the first and second sealing members (32, 34) are located within the middle half of the treatment cartridge's overall length. The sealing members can be O-rings disposed in grooves 35 (FIG. 21) in the first and second body portions in some embodiments. In some embodiments, a cartridge inlet orifice 36 is located in the first body portion, the second body portion, or both and is located between the first and second sealing members (32 and 34) and though the exterior surface of the housing 20. In various embodiments, the cartridge inlet orifice 36 can be located within the middle half of the translating treatment cartridge's overall length. Multiple inlet orifices can be provided to enhance fluid flow.

A treatment media 38 such as a carbon block is located within the housing 20 such that fluid entering the cartridge inlet orifice 36 passes through the treatment media 38 and out a dispensing orifice 40 located on the second end 24. In other embodiments, the dispensing orifice 40 can be located in the first end 22, the first body portion 26, the second body portion 28, or another portion of the housing 22 as discussed later. As best seen in FIG. 6, the fluid enters one or more cartridge inlet orifice(s) 36 and fills an outer chamber 42 within the housing 20, passes through the treatment media 38 (carbon block) into a center channel 44, flows towards the second end 24 and out the dispensing orifice 40 located on the second end 24. In some embodiments, the dispensing orifice 40 is placed on a 90 degree elbow such that the fluid is dispensed substantially perpendicular to a central axis line 6-6 of the treatment cartridge extending from the first end 22 to the second end 24.

In some embodiments, the first body portion 26 has a larger cross sectional area than the second body portion 28. In some embodiments, the first and second body portions are cylindrical and the first body portion has a larger diameter than the second body portion. By providing different cross sectional areas, it can be easier to insert the translating treatment cartridge 14 into the manifold 12 and provide the cam surface 30 as a ramp or chamfer between the first body portion and the second body portion due to the change in diameter or cross sectional area between the first body portion to the second body portion. The differential areas can also be leveraged to push the cartridge back into the manifold since water pressure will be acting on cam surface chamfer after actuation thereby tending to pull the cartridge back into the manifold and shut off the flow of water unless the dispensing lever is continually depressed. To achieve more force the second body portion can be made smaller such that the chamfered area being acted on by the hydraulic pressure is larger.

In some embodiments, a cartridge handle 46 is provided on the first end 22 for ease of rotating the translating treatment cartridge 14 when installing it into the manifold 12. In some embodiments a dispensing lever engagement feature 48 is provided on the second end 24. The dispensing lever engagement feature can be a screw thread, a snap fit, a rigid connection to a flexible portion of the lever, a ball and socket, a clevis and pin, a quarter turn fastener, a living hinge, or other connection that allows for linear motion of the translating treatment cartridge and rotational motion of the dispensing lever.

In one embodiment, the dispensing lever engagement feature 48 comprised a first projection 50 extending from the second end 24 and a second projection 52 extending concentrically along the central axis from the first projection 50 having a smaller cross sectional area. The dispensing lever engagement feature further includes a first pin 54 extending radially from the distal end of the first projection 50 and a second pin 56 extending radially from the distal end of the second projection 52. In some embodiments, the first and second pins (54, 56) extend radially from both sides of the first and second projections (50, 52) and oppose each other as best seen in FIG. 6 where four pins are shown in cross section forming a letter "H". In some embodiments, the dispensing orifice 40 is located within a nozzle 58 extending radially from the first projection 52.

Figure 1:
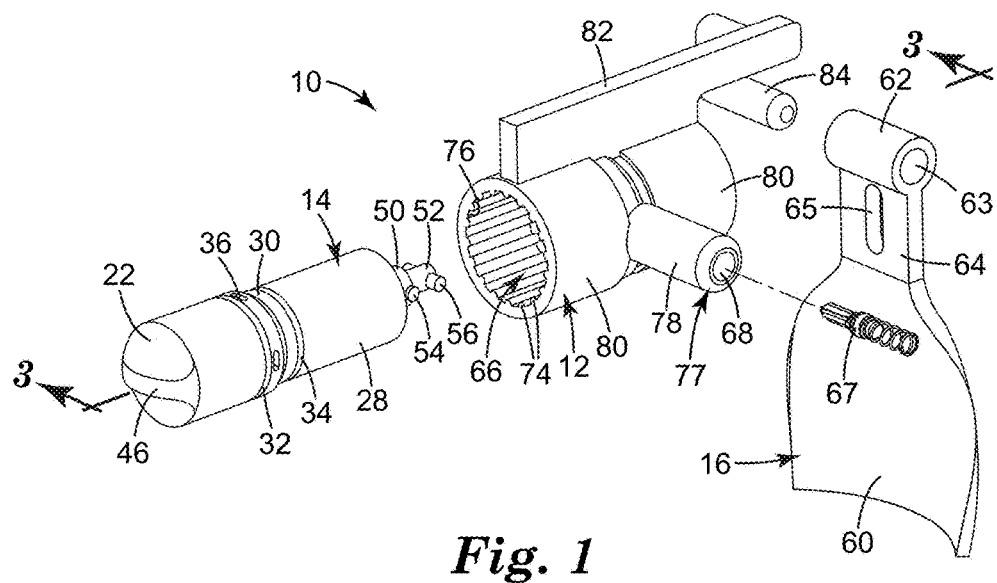
FIG. 1 illustrates an exploded perspective view of a first embodiment of the treatment cartridge and manifold of the fluid dispensing system.

Referring now to FIG. 1, the dispensing lever 16 in one embodiment comprised a paddle end 60, a bushing end 62 having a bore 63 and a slotted portion 64 having a through slot 65 connecting the bushing end to the paddle end. To install the translating treatment cartridge 14 into the manifold 12, the second end 24 is aligned with a cartridge bore 66 of the manifold 12 and the translating treatment cartridge is inserted. Using the optional cartridge handle 46, the second pin(s) 56 are aligned with the slot 65 such that the second pins pass through the slot 65 and the front of the slotted portion 64 butts against the distal end of first projection 50. Thereafter, the translating treatment cartridge is rotated 90 degrees capturing the slotted portion 65 of the dispensing lever 16 between the first and second pins (54, 56) as best seen in FIG. 2.

Figure 4A:
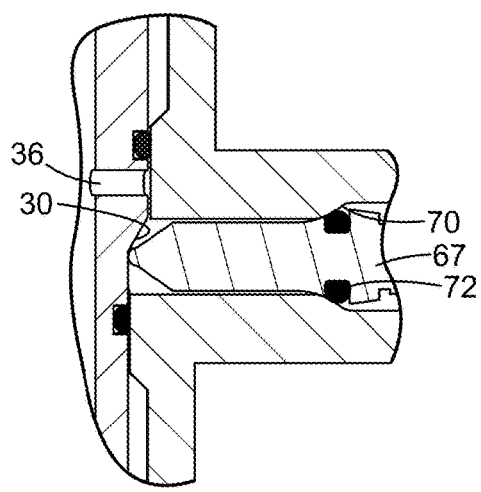
FIG. 4A illustrates a magnified cross section of the manifold and filter's valve actuating mechanism in a closed position.
Figure 4B:
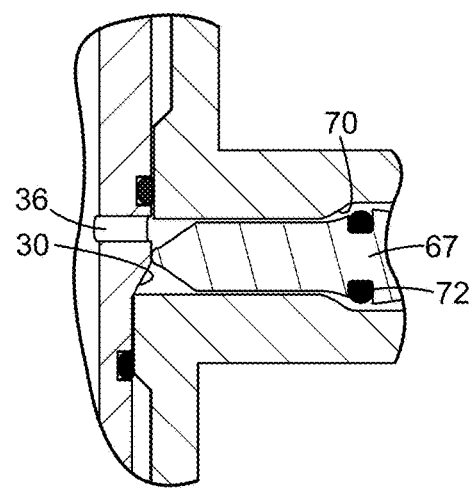
FIG. 4B illustrates a magnified cross section of the manifold and filter's valve actuating mechanism in an open position.

Referring now to FIGS. 2 and 4, when the paddle end 60 of the dispensing lever 16 is pushed to dispense water it pivots about the bushing end 62 and pulls the translating treatment cartridge 14 further into the manifold 12 engaging the cam surface 30 with a spring biased poppet valve 67 located in an inlet bore 68 in the manifold 12. The spring biased poppet valve 67 is translated linearly away from its valve seat 70 by the cam surface 30 as the treatment cartridge is translated linearly farther into the manifold to allow water to flow past the valve seat 70 and into the cartridge inlet orifice 36 of the translating treatment cartridge 14. The spring biased poppet valve 67 can include an optional O-ring 72 for enhanced sealing with the valve seat 70. Thus, until the dispensing lever 16 is pushed and the spring biased poppet valve 67 is moved away from its valve seat 70, there is no pressure on any fluid remaining inside the housing 12 since the dispensing orifice 40 is open to atmosphere. As such, the housing 12 can be made from thinner or cheaper materials which may not be suitable for use as a pressure vessel or as freeze tolerant if the treatment cartridge was located near the freezer compartment.

Figure 3:
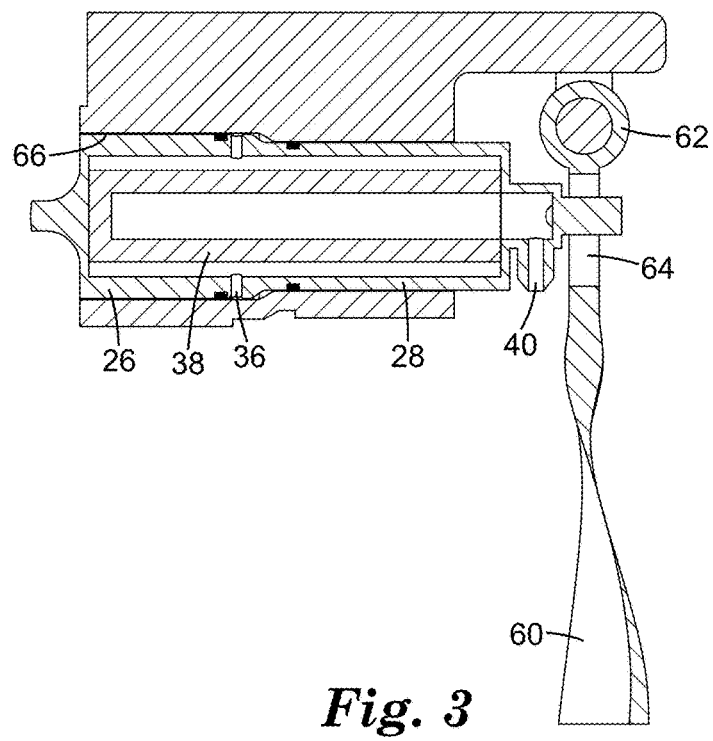
FIG. 3 illustrates a cross section view of FIG. 1 taken at 3-3 of FIG. 1.

Referring now to FIG. 1, the manifold 12 includes the cartridge bore 66, which in some embodiments is reduced or stepped in cross sectional area to correspond with the first and second body portions (26, 28) as shown in FIG. 3. The cartridge bore 66 can comprise optional longitudinal ribs 74 and longitudinal grooves 76 to reduce frictional contact between the cartridge bore 66 and the first and second body portions (26, 28). The manifold further includes a fluid inlet 77. The fluid inlet, in one embodiment, includes an inlet projection 78 extending from an outer surface 80 having the inlet bore 68 housing the spring biased poppet 67 valve and valve seat 70. Since the dispensing orifice 40 is in the translating treatment cartridge's housing 22, the manifold 12 in many embodiments does not have a fluid outlet or provision for connection of a fluid outlet.

Extending longitudinally from the outer surface 80 is a dispensing lever support arm 82. A distal end of the support arm 82 has a distending transverse pin 84 for engagement with the bushing end 62 of the dispensing lever 16. A dispensing lever retainer such as a c-clip, cotter pin, push nut, nut, screw, snap fit, press fit, or other suitable fastener or method can optionally be positioned on the distal end of the distending transverse pin 84 to retain the bushing end 62 on the transverse pin if desired.

As discussed, the manifold 12 and translating treatment cartridge 14 together act like a hydraulic spool valve with the translating treatment cartridge 14 becoming a spool within the manifold 12 such that linear translation of the treatment cartridge controls the flow of fluid out of the manifold 12, into the translating treatment cartridge 14, and out of the dispensing orifice 40. As such, at least one of the first and second body portions (26 and 28) or both comprise a linear bearing surface and at least a portion of the cartridge bore 66 comprises a bushing such that the translating treatment cartridge 14 is supported for linear motion within the manifold during use.

Since the translating treatment cartridge 14 acts as a translating spool a significant portion of its overall length, L, is contained within the cartridge bore 66 as seen in the various embodiments. As such, in some embodiments, at least 30, 40, 50, 60, 70, 80, or 90% of the length of the first or the second body portion (26, 28) can be contained within the inlet bore 66 when the translating treatment cartridge is not dispensing fluid. In other embodiments, at least 30, 40, 50, 60, 70, 80, or 90% of the length of the first and second body portions (26, 28) can be contained within the cartridge bore 66 when the translating treatment cartridge is not dispensing fluid. For example, as best seen in FIG. 3, in one embodiment, approximately 100 percent of the length of the first body portion 26 was contained in the cartridge bore 66 and approximately 75% of the length of the second body portion 28 was contained in the cartridge bore.

Figures 7A, 7B:
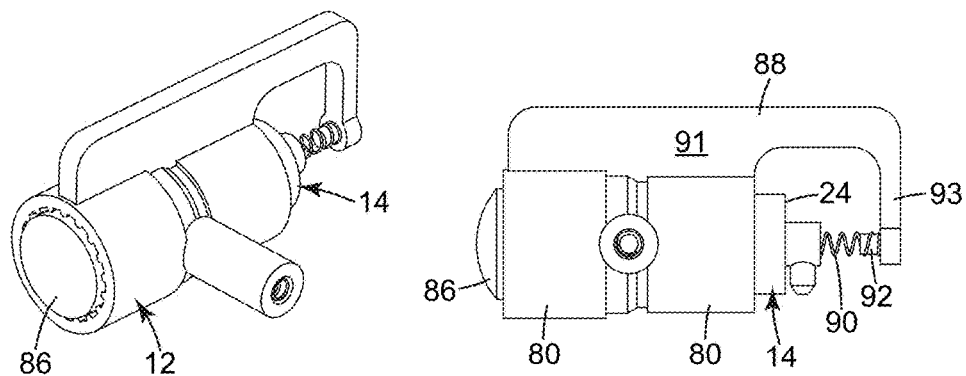
FIG. 7A illustrates a perspective view of a second embodiment of the treatment cartridge and manifold of the fluid dispensing system.
FIG. 7B illustrates a side view of the second embodiment of the treatment cartridge and manifold of the fluid dispensing system.

Referring now to FIGS. 7A and 7B another embodiment of the dispensing system is shown. The main components of the dispensing system include the manifold 12 and the translating treatment cartridge 14. In this embodiment, the dispensing lever 16 is omitted in favor of a "push-button" actuation. The translating treatment cartridge 14 is substantially the same as described for FIG. 5 with the removal of the cartridge handle 46, the second projection 52, and the first and second pins (54, 56) extending radially from both sides of the first and second projections (50, 52). Instead, a hemispherical first end 86 is provided for pressing on to translate the treatment cartridge 14 within the manifold 12. The manifold 12 is substantially the same as described for FIG. 1 with the removal of the dispensing lever support arm 82. Instead a treatment cartridge spring return arm 88 and a treatment cartridge return spring 90 are provided. The treatment cartridge spring return arm 88 is generally "L" shaped with the long arm portion 91 of the L attached to the exterior surface 80 of the manifold 12 and the distending short arm portion 93 of the L spaced apart from the first projection 50 on the second end 24 of the translating treatment cartridge 14. A spring support projection 92 extends from the short arm portion 93 back toward the second end 24 of the translating treatment cartridge 14 and the cartridge return spring 90 is captured on the spring support projection 92. Alternatively, the cartridge return spring 90 can be positioned or captured in a bore in the translating filter cartridge or captured on a spring support projection on the translating filter cartridge thus providing a new spring with each new translating filter cartridge change.

In use, the translating treatment cartridge 14 and manifold 12 operate similar to the first embodiment. To dispense a fluid, the hemispherical first end 86 is pushed to the right compressing the cartridge return spring 90 and actuating the spring biased poppet valve 67 with the cam surface 30. When the glass or container is full, the hemispherical first end 86 is released and the cartridge return spring 90 translates the treatment cartridge 14 to the left such that the spring biased poppet valve 67 returns to its valve seat 70 shutting off the flow of fluid from the dispensing orifice 40.

Referring now to FIGS. 8A-9B a third embodiment of the dispensing system is shown. The main components of the dispensing system include the manifold 12, the translating treatment cartridge 14, and the dispensing lever 16. In this embodiment, two dispensing orifices 40 are provided, a first dispensing orifice 98 in the first body portion 26 and a second dispensing orifice 100 located in the second body portion 28.

Figure 8A:
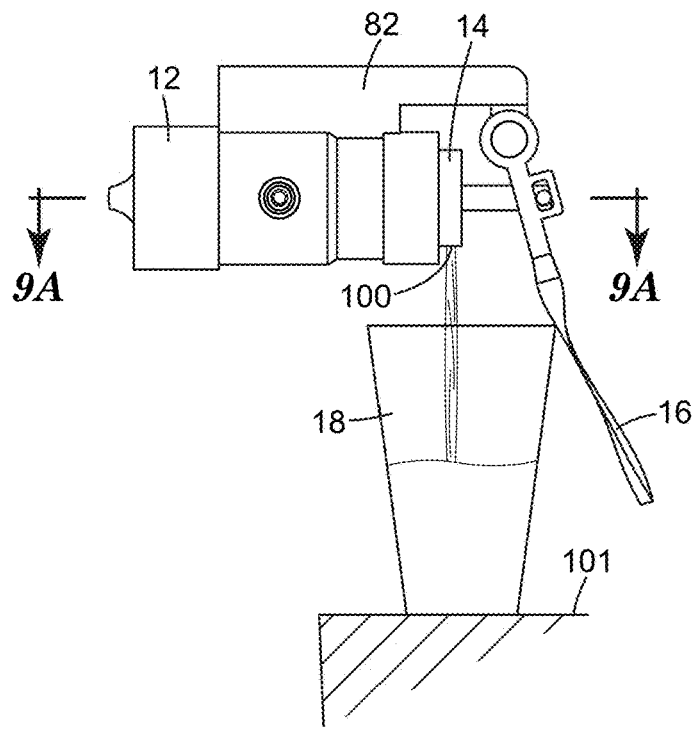
FIG. 8A illustrates a side view of a third embodiment of the treatment cartridge and manifold of the fluid dispensing system dispensing water into a glass.

As best seen in FIG. 8A, placing a glass 18 under the translating treatment cartridge 14 and pushing the dispensing lever 16 to the right slides the translating treatment cartridge linearly within the manifold 12 causing the cam surface 30 on the filter's exterior to actuate the poppet valve sending water from the poppet valve though the filter, out the second dispensing orifice 100 in the second body portion 28 and into the glass 18. A support 101 may be provided for the glass or the dispensing system may be located such that the distance from the second dispensing orifice 100 to another object is limited such that a tall pitcher, coffee carafe, pot, or other container cannot be positioned under the second dispensing orifice 100.

Figure 8B:
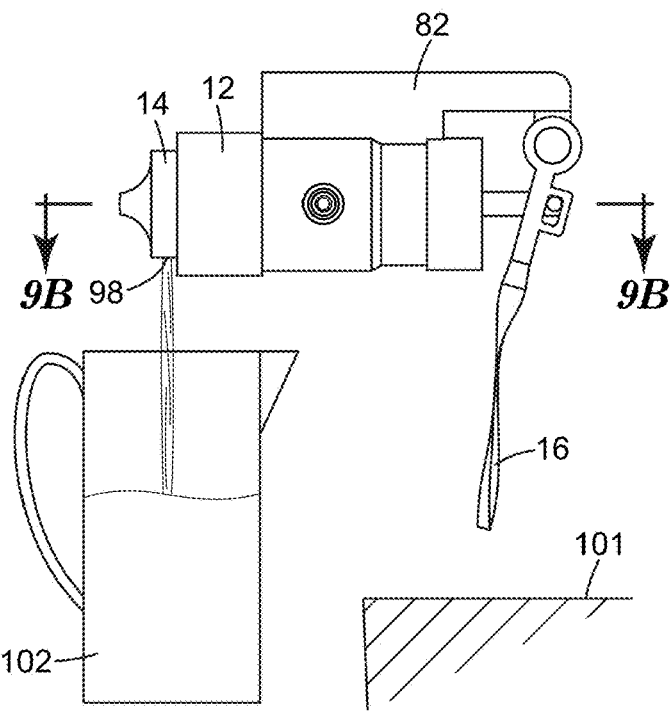
FIG. 8B illustrates a side view of the third embodiment of the treatment cartridge and manifold of the fluid dispensing system dispensing water into a pitcher.

As best seen in FIG. 8B, placing a pitcher 102 or other container under the translating treatment cartridge 14 and pushing the dispensing lever 16 to the left slides the translating treatment cartridge linearly within the manifold 12 causing the cam surface on the filter's exterior to actuate the poppet valve sending water from the poppet valve though the filter, out the first dispensing orifice 98 in the first body portion 26 and into the pitcher 102. Since the first end 22 of the translating treatment cartridge is generally more open and accessible, significantly larger containers may be more conveniently positioned under the first dispensing orifice 98. Alternatively, the dispensing system can be provided with only the first dispensing 98 instead of two dispensing orifices.

Figure 10:
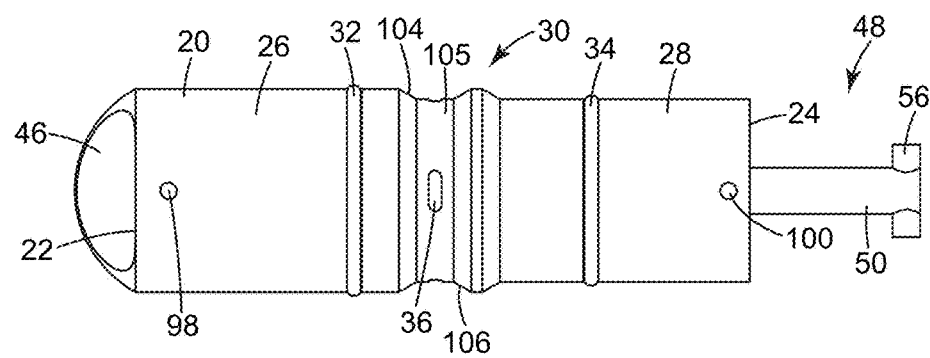
FIG. 10 illustrates the translating treatment cartridge of the third embodiment.

Referring now to FIG. 10, the translating treatment cartridge 14 includes a housing 20 having a first end 22, a second end 24, a first body portion 26, a second body portion 28, and a cam surface 30 located between the first and second body portions. In various embodiments, the cam surface 30 is located within the middle half of the translating treatment cartridge's overall length. In this embodiment, the cam surface 30 includes a first cam surface 104 located between a valley portion 105 and the first body portion 26 and a second cam surface 106 located between the valley portion 105 and the second body portion 28. The first and second cam surfaces can be chamfers as shown or discrete projections or ramps for displacing the spring biased poppet valve 67.

Figure 9A:
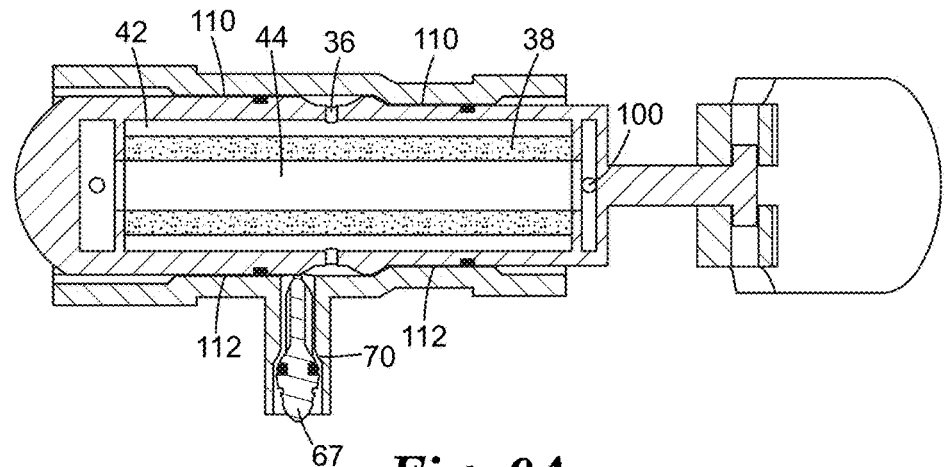
FIG. 9A illustrates a front view and cross section taken at 9A-9A of FIG. 8A.
Figure 9B:
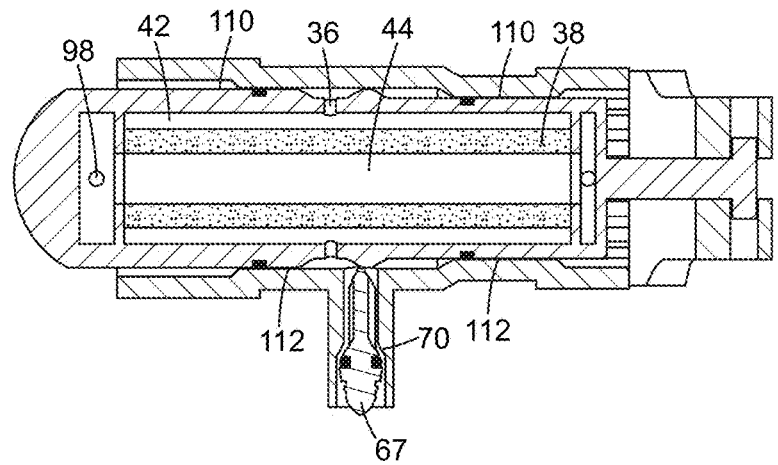
FIG. 9B illustrates a front view and cross section taken at 9B-9B of FIG. 8B.

The first cam surface 104 engages the spring biased poppet valve 67 when dispensing out the second dispensing orifice 100 as shown in FIG. 9A when the treatment cartridge is translated farther into the manifold 12 towards the dispensing lever 16. The second cam surface 106 engages the spring biased poppet valve 67 when dispensing out the first dispensing orifice 98 as shown in FIG. 9B when the treatment cartridge is translated out of the manifold 12 away from the dispensing lever 16. The valley portion 105 is at an elevation low enough such that the spring biased poppet valve 67 remains seated against the valve seat 70 preventing any flow of fluids past the valve seat when the spring biased poppet valve 67 is centered in the off position between the first and second cam surfaces (104, 105). The valley portion 105 can have one or more inlet orifices as illustrated to allow fluid to enter the translating filter cartridge.

In some embodiments, a first sealing member 32 is located on the first body portion 26 nearer the first cam surface 104 than the first end 22 and a second sealing member 34 is located on the second body portion 28 between the second cam surface 106 and the second end 24. In various embodiments, the first and second sealing members (32, 34) are located within the middle half of the treatment cartridge's overall length. The sealing members can be O-rings disposed in grooves in the first and second body portions in some embodiments. In other embodiments, a cartridge inlet orifice 36 can be located in one or more locations such as the first body portion, the valley portion, and/or second body portion and is located between the first and second sealing members (32 and 34) and though the exterior surface of the housing 20.

A treatment media 38 such as a carbon block is located within the housing 20 such that fluid entering the cartridge inlet orifice 36 passes through the treatment media 38 and out either the first or the second dispensing orifice (98, 100). As best seen in FIGS. 9A and 9B, the fluid enters one or more cartridge inlet orifice(s) 38 and fills an outer chamber 42 within the housing 20, passes through the treatment media 38 (carbon block) into a center channel 44, flows towards the second end 24 and out the first or the second dispensing orifice (98, 100).

In some embodiments, the first body portion 26 has a larger cross sectional area than the second body portion 28. In some embodiments, the first and second body portions are cylindrical and the first body portion has a larger diameter than the second body portion. By providing different cross sectional areas, it can be easier to insert the translating treatment cartridge 14 into the manifold 12 and provide the cam surface 30 as a ramp or chamfer between the first cylindrical body portion and the second cylindrical body and the valley portion due to the change in diameters between the first body portion to the second body portion.

In some embodiments, a cartridge handle 46 is provided on the first end 22 for ease of rotating the translating treatment cartridge 14 when installing it into the manifold 12. In some embodiments a dispensing lever engagement feature 48 is provided on the second end 24. In one embodiment, the dispensing lever engagement feature 48 comprised a first projection 50 extending from the second end 22 and a first pin 54 extending radially from the distal end of the first projection 50. In some embodiments, the first pin 54 extends radially from both sides of the first projections 50 and oppose each other as best seen in FIG. 10.

Figure 11:
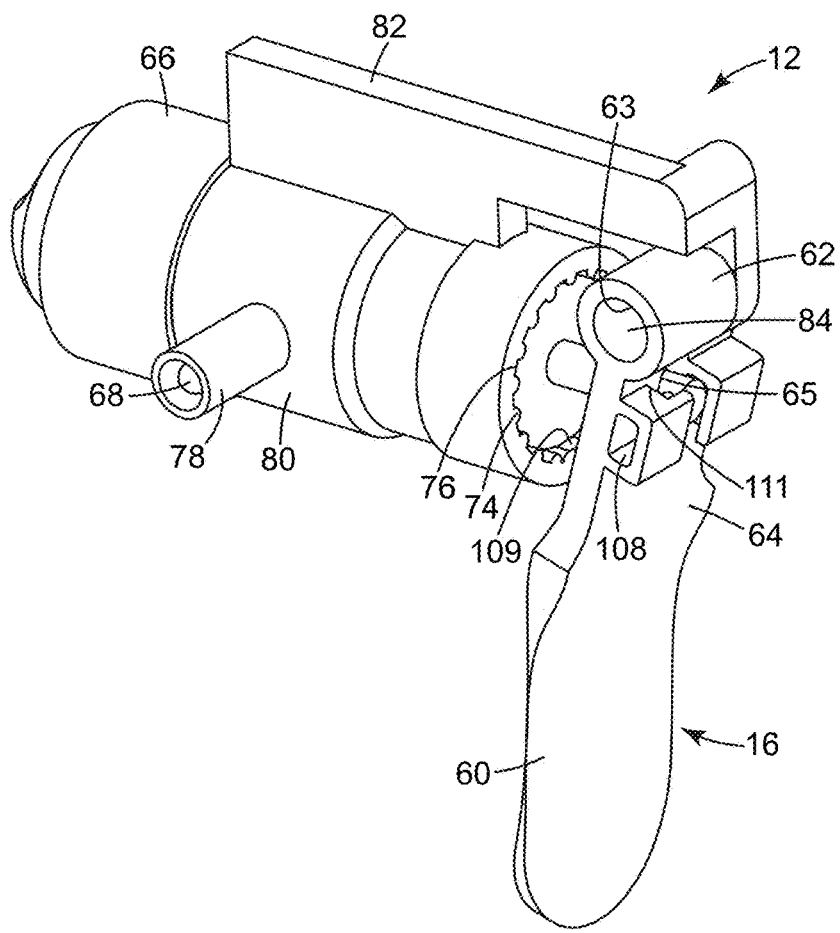
FIG. 11 illustrates the manifold of the third embodiment.
Figure 12:
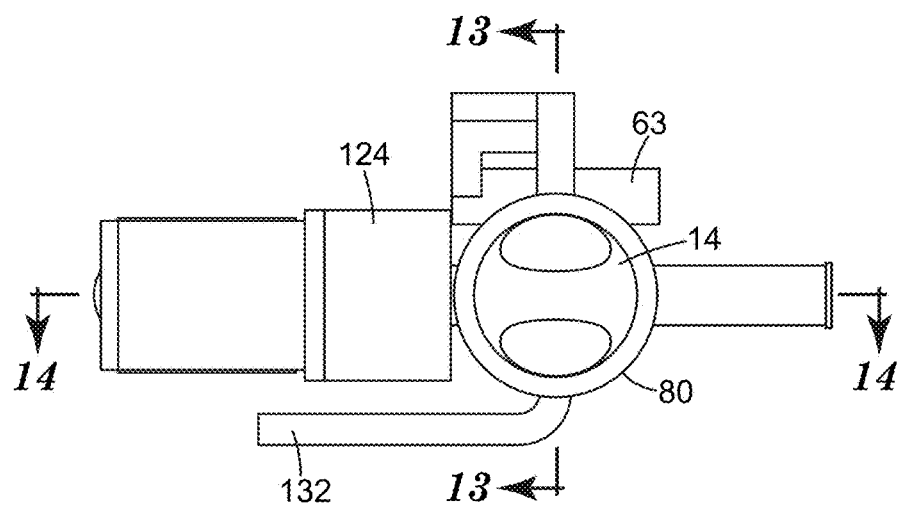
FIG. 12 illustrates a front view of a fourth embodiment of a translating treatment cartridge and manifold.

Referring now to FIG. 11, the dispensing lever 16 in one embodiment comprised a paddle end 60, a bushing end 62 having a bore 63 and a slotted portion 64 having a through slot 65 connecting the bushing end to the paddle end. To install the translating treatment cartridge 14 into the manifold 12, the second end 24 is aligned with a cartridge bore 66 of the manifold 12 and the translating treatment cartridge is inserted. Using the optional cartridge handle 46, the first pin(s) 54 are aligned with the slot 65 such that the first pins pass through the slot 65. Thereafter, the translating treatment cartridge is rotated 90 degrees capturing the first pins 54 in the slotted portion 65 of the dispensing lever 16 in pin retaining cage(s) 108 located on the backside of the slotted portion 64. While only a single pin 54 and retaining cage 108 is needed, it may be advantageous to provide two of each for additional strength as shown. The pin retaining cages 108 have clearance cutouts 111 on the top of one cage and on the bottom of the opposing cage to allow the first pins 54 to rotate into a horizontal position and to be captured by the pin retaining cages after passing through the slotted portion 65 of the dispensing lever 16.

Thus, until the dispensing lever 16 is pushed and the spring biased poppet valve 67 is moved away from its valve seat 70, there is no pressure on any fluid remaining inside the housing 12 since the dispensing orifice 40 is open to atmosphere. As such, the housing 22 can be made from thinner or cheaper materials which may not be suitable for use as a pressure vessel or as freeze tolerant if the treatment cartridge was located near the freezer compartment.

The manifold 12 includes the cartridge bore 66, which in some embodiments is reduced or stepped in cross sectional area to correspond with the first and second body portions (26, 28). The cartridge bore 66 can comprise optional longitudinal ribs 74 and longitudinal grooves 76 to reduce frictional contact between the cartridge bore 66 and the first and second body portions (26, 28). The manifold further includes, an inlet projection 78 extending from an outer surface 80 having the inlet bore 68 housing the spring biased poppet 67 valve and valve seat 70. Extending longitudinally from the outer surface 80 is a dispensing lever support arm 82. A distal end of the support arm 82 has a distending transverse pin 84 for engagement with the bushing end 62 of the dispensing lever 16. A dispensing lever retainer such as a c-clip, cotter pin, push nut, nut, screw, or other suitable fastener can be positioned on the distal end of the distending transverse pin 84 to retain the bushing end 62 on the transverse pin.

The manifold 12 can include an optional longitudinal sealing strip 109 of an elastomeric material such that when the translating treatment cartridge is in the off position and the spring biased poppet valve 67 is not actuated, the first and second dispensing orifices (98, 100) are sealed or closed off. Optionally, an orifice seal can be placed around the first and second dispensing orifices (98, 100) on the exterior surface of the housing 12. Until the dispensing lever 16 is pushed or pulled and the spring biased poppet valve 67 is moved away from its valve seat 70, there is no pressure on any remaining fluid inside the housing 12. As such, the longitudinal sealing strip 109 is intended to prevent leaking of any remaining fluid from the translating treatment cartridge 14 into the manifold 12 rather than to withstand any significant applied fluid pressure. As such, a modest or inexpensive face seal can be designed. The sealing feature(s) can be used on any other embodiment disclosed herein.

As discussed, the manifold 12 and treatment cartridge 14 together act like a hydraulic spool valve with the translating treatment cartridge 14 becoming a spool within the manifold 12 such that linear translation of the treatment cartridge controls the flow of fluid out of the manifold, into the translating treatment cartridge, and out one of the dispensing orifices. As such, at least one of the first and second body portions (26 and 28) comprises a linear bearing surface 110 and at least a portion of the cartridge bore 66 comprises a bushing 112 such that the translating treatment cartridge 14 is supported for linear motion within the manifold during use.

Referring now to FIGS. 12-16 a fourth embodiment is illustrated. In this embodiment, the manifold 12 is provided with an auxiliary outlet port 114 (FIG. 13) through the outer surface 80. The auxiliary outlet port 114 can be used to supply filtered water to an auxiliary location when it is aligned with the dispensing orifice 40 in the translating treatment cartridge within the manifold 12. The auxiliary location may be an ice maker or other appliance needing the filtered water.

Figure 15:
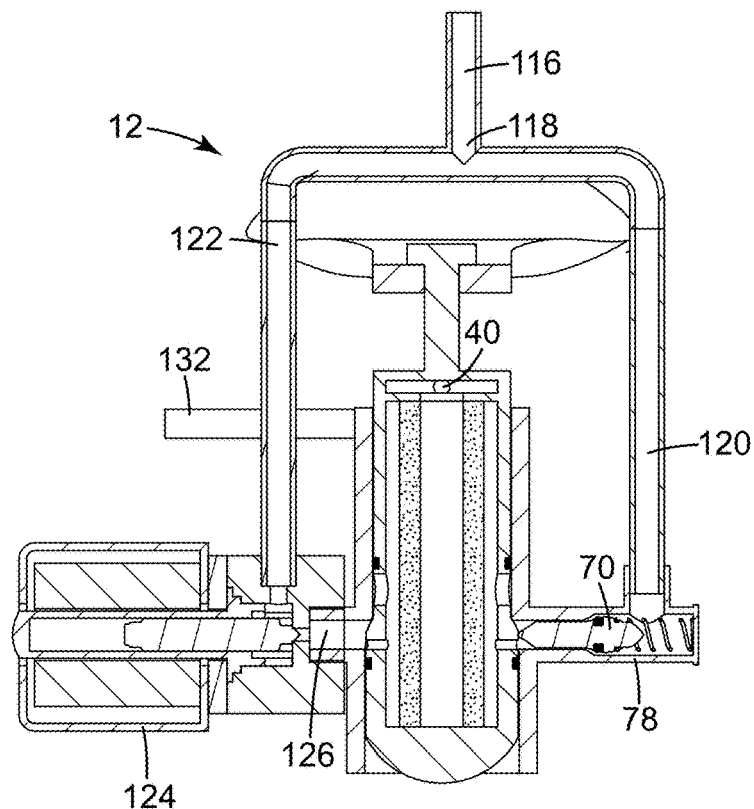
FIG. 15 illustrates a cross section taken at 14-14 in FIG. 12 when dispensing into a glass.
Figure 16:
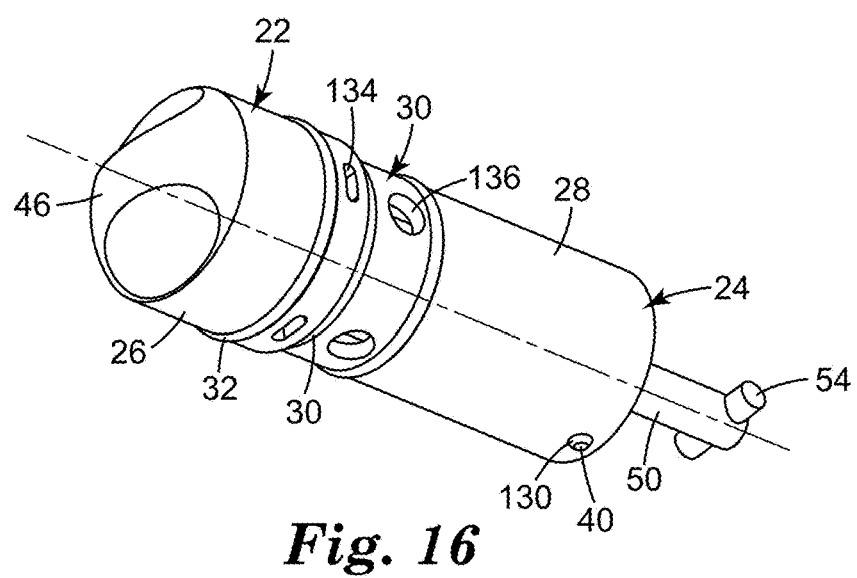
FIG. 16 illustrates the translating treatment cartridge used in the embodiment of FIG. 12.

As with previous systems, pressing on paddle end 60 moves the translating treatment cartridge 14 up in FIG. 15, the cam surface 30 actuates the spring biased poppet valve 67 dispensing water out of the dispensing orifice 40 into the atmosphere and into a glass or container.

The translating treatment cartridge 14 uses a combination of features shown in FIGS. 1 and 10 where like reference numerals refer to like components as previously discussed for to the embodiments. The main difference is that the translating treatment cartridge 14 has a first inlet orifice 134 located in the first body portion 26 and a second inlet orifice 136 located in the second body portion 28. A single dispensing orifice 40 is provided in the second body portion 28;

however, if desired dual dispensing orifices (front and back) and the cam surface 30 as shown in FIG. 10 could be provided.

Figure 13:
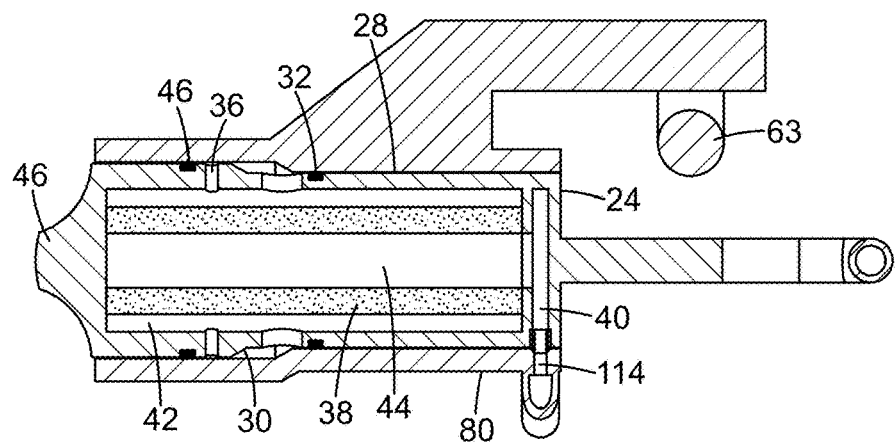
FIG. 13 illustrates a cross section taken at 13-13 in FIG. 12.

The manifold 12 further includes an inlet supply tube 116, a tee fitting 118, a poppet valve supply tube 120, a solenoid valve supply tube 122, a solenoid valve 124, and a second fluid 126 inlet in the manifold 12. When the translating fitter cartridge 14 is in the neutral, retracted, or off position as shown in FIG. 13, the dispensing orifice 40 is aligned with the auxiliary outlet port 114 and the spring biased poppet valve 67 is seated against valve seat 70 shutting off any fluid flow through the poppet valve supply tube 120. As such, there is no pressure on any remaining fluid within the translating treatment cartridge 14. An auxiliary port seal 130 (elastomeric projection, elastomeric strip, etc.) can be provided to fluidly seal the dispensing orifice 40 with the auxiliary port 114 such that any fluid moving through the auxiliary port flows out the auxiliary supply tube 132 instead of leaking into the manifold 12. The auxiliary port seal 130 can be provided on the translating treatment cartridge 14 or on the cartridge bore 66 of the manifold 12.

Figure 14:
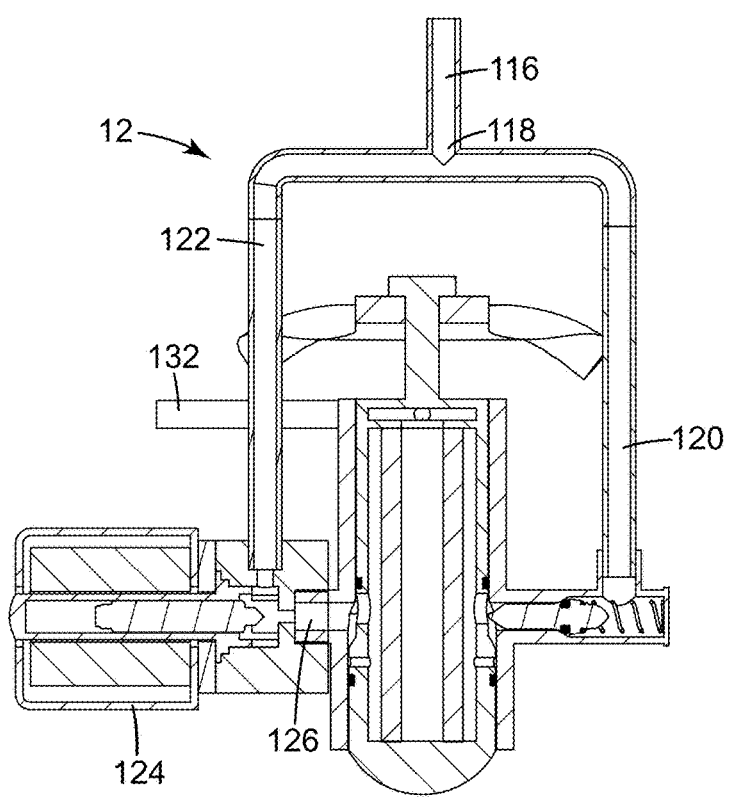
FIG. 14 illustrates a cross section taken at 14-14 in FIG. 12 when an auxiliary fluid circuit is operational.

As best seen in FIG. 14, when the auxiliary appliance needs water, the solenoid valve 124 is actuated opening the solenoid valve 124 and fluid moves from the inlet supply tube 116, through the tee fitting 118, through the second fluid inlet 126, through the manifold 12 into the second inlet orifice 136 which is generally aligned with the solenoid valve when the translating treatment cartridge is retracted into the manifold, through the treatment media 38, out the dispensing orifice 40, and out the auxiliary supply tube 132. When the auxiliary appliance no longer needs water, the solenoid valve 124 is turned off shutting off the water supply. When water is to be dispensed into a glass, the dispensing system is operated as previously described and the translation of the treatment cartridge 14 generally aligns the first inlet orifice 134 with the spring biased poppet valve 67 and water flows from the manifold 12, through the translating treatment cartridge 14 and out the dispensing orifice 40. Due to the translating of the treatment cartridge 14 within the manifold 12, it can be more convenient to provide multiple inlet orifices at different lengths along the central axis of the translating treatment cartridge 14 so they align as needed within the manifold depending on the position of the filter. Thus, the translating treatment cartridge 14, acts as a spool in a hydraulic spool valve shuttling the dispensing orifice 40 between dispensing into the atmosphere adjacent the dispensing lever 16 or dispensing into the auxiliary outlet port 114 within the manifold 12 to supply an auxiliary appliance.

In many embodiments, it may be desirable to limit rotational movement of the translating treatment cartridge 14 within the manifold 12 about the central axis. This can be desirable to ensure that the dispensing orifice 40 is pointed in a certain direction or aligned as needed for proper dispensing or to align with the auxiliary outlet port. In some embodiments, a non-circular cross section for either the first body portion 26, the second body portion 28 or both can be used with a corresponding cartridge bore 66 profile in the manifold 12 such that the translating treatment cartridge is unable to rotate within the cartridge bore 66 like the circular cross section of the translating treatment cartridge would in FIG. 1.

Figure 17:
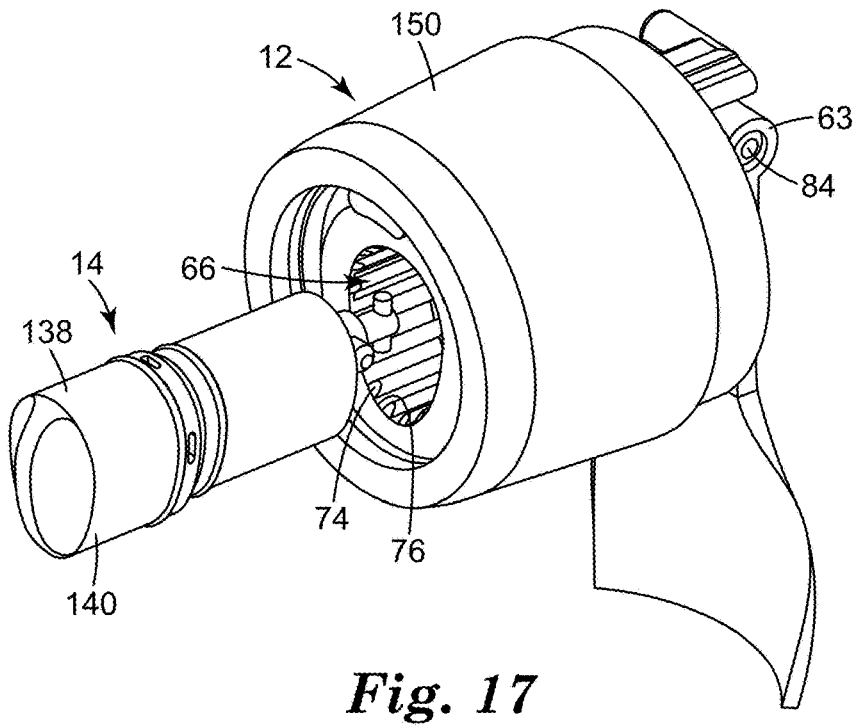
FIG. 17 illustrates a front perspective of fifth embodiment of a translating treatment cartridge and manifold.
Figure 18:
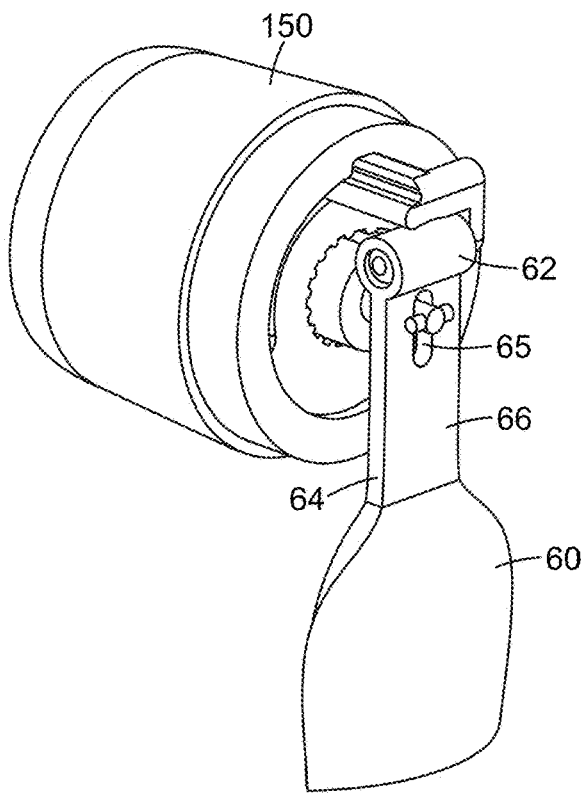
FIG. 18 illustrates the embodiment of FIG. 17 in a rear perspective.
Figure 19:
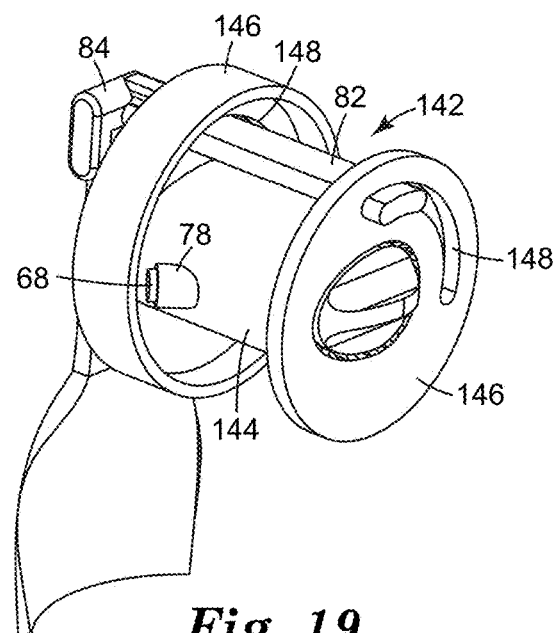
FIG. 19 illustrates the manifold of FIG. 17 with the cover removed.
Figure 20:
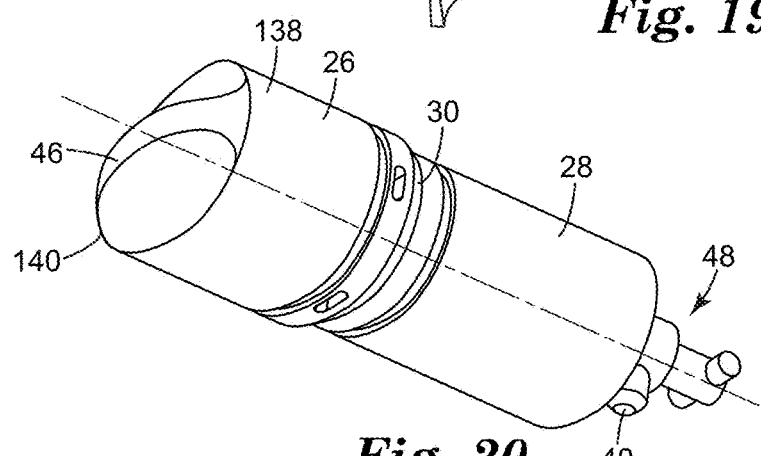
FIG. 20 illustrates a perspective view of the translating treatment cartridge of FIG. 17.

Referring now to FIGS. 17-21 a fifth embodiment of the dispensing system is shown. The translating treatment cartridge 14 is similar to the embodiment of FIG. 5; however, the first body portion 26 and the second body portion 28 are noncircular. In particular, the first and second body portions are ovoid shaped with one axis of symmetry and having a larger radius side 138 and an opposing smaller radius 140 side as best seen in FIGS. 17 and 20.

The first and second body portions (26, 28) could have various cross sectional shapes such as an ellipse, an oval, a square, a rectangle, a hexagon, a polygon, or tapered. It is not necessary that the first and second body portions even have the same cross-sectional shape. For example, the first body portion 26 could be circular cross section and the second body portion 28 could be a slightly smaller hexagonal cross section. In some embodiments, the sealing surfaces could still be circular, if needed, by using transitional circular cross sections before and after the cam surface 30. Utilization of different cross sectional shapes for the first and second body portions can provide a keying function such that different translating treatment cartridges 14 will only fit and work in a specific manifold 12 even though they may have a similar size cross sectional area. Since the translating treatment cartridge 14 is no longer under any significant pressure in operation, cross sectional shapes that would not be practical for use as a pressure vessel due to stress concentrations can be utilized without concern for undo stress concentrations or bursting in use.

Figure 21:
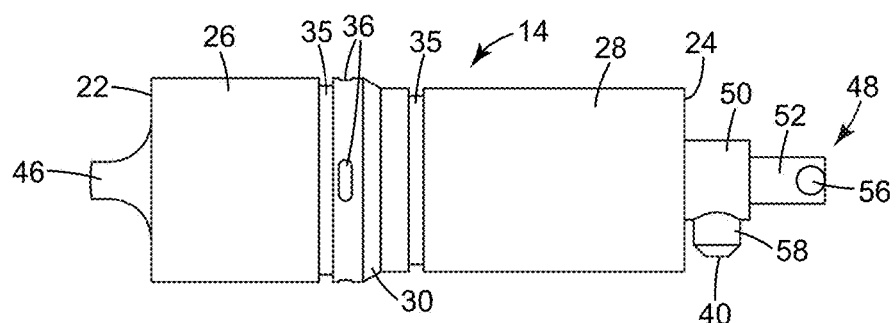
FIG. 21 illustrates a side view of the translating treatment cartridge of FIG. 17.

The translating treatment cartridge 14 is similarly contrasted as described in the embodiment for FIGS. 1-6. In this embodiment, the cross sectional shape for the first and second body portions (26, 28) is changed from circular to ovoid as previously mentioned and the dispensing lever engagement feature further eliminates the first pin 54 extending radially from the distal end of the first projection 50 having only the second pin 56 extending radially from the distal end of the second projection 52 as seen in FIG. 21; although both pins could be provided if desired.

Referring now to FIGS. 17, 18, and 19 the manifold 12 includes the cartridge bore 66, which in some embodiments is reduced or stepped in cross sectional area to correspond with the first and second body portions (26, 28) as shown in FIG. 3. The cartridge bore 66 can comprise optional longitudinal ribs 74 and longitudinal grooves 76 to reduce frictional contact between the cartridge bore 66 and the first and second body portions (26, 28). The manifold further includes, a spool housing 142 having a hollow oval shaped center section 144 forming the cartridge bore 66, and two opposing flanges 146 on each end of the oval shaped center section. The inlet projection 78 extends from the oval shaped center section 144 having the inlet bore 68 housing the spring biased poppet 67 valve and valve seat 70. Since the dispensing orifice 40 is in the translating treatment cartridge's housing 22, the manifold 12 in many embodiments does not have a fluid outlet or provision for the connection of a fluid outlet.

Captured within a circular slot 148 in each of the opposing flanges 146 is the longitudinally extending dispensing lever support arm 82. The circular slots in this embodiment extend for a radial arc of slightly more than 90 degrees such that rotation of the spool housing is limited to 90 degrees from when the dispensing lever support arm hits one end of the circular slot to when it hits the other end of the circular slot. A distal end of the support arm 82 has the distending transverse pin 84 for engagement with the bushing end 62 of the dispensing lever 16. An outer cover 150 is provided for aesthetics in some embodiments. Various elements such as support internal framework or mounting structures for the manifold 12 to another object have not been illustrated for clarity and can be added as necessary depending on the mounting location desired for the manifold 12.

The translating treatment cartridge 14 installs in the manifold 12 similar to the embodiment of FIGS. 1-6. As best seen in FIGS. 17-19, to install the translating treatment cartridge 14 into the manifold 12, the second end 24 is aligned with the cartridge bore 66 of the manifold 12 and the translating treatment cartridge 14 is inserted. Using the optional cartridge handle 46, the second pin(s) 56 are aligned with the slot 65 such that the second pins pass through the slot 65 and the front of the slotted portion 64 butts against the distal end of first projection 50. Thereafter, the translating treatment cartridge is rotated 90 degrees capturing the slotted portion 65 of the dispensing lever 16 between the first projection 50 and second pins 56 as best seen in FIG. 18. The circular slots 148 in combination with the dispensing lever support arm 82 limits rotation of the spool housing 142 and translating treatment cartridge about the central axis to 90 degrees from the installation orientation shown in FIG. 17 to the dispensing orientation shown in FIG. 19. A biasing member such as a helical spring can be used to bias the spool housing 142 to the dispensing orientation if desired or a catch or interference fit can be provided to hold the spool housing 142 in the dispensing orientation unless the handle 46 is turned to release it.

Figure 24:
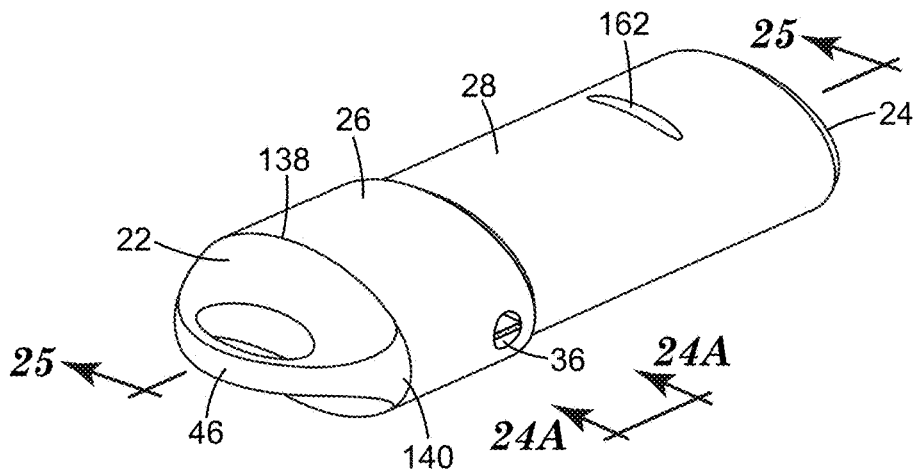
FIG. 24 illustrates a perspective view of the translating filter of FIG. 22.

Referring now to FIGS. 22-27 a sixth embodiment for the dispensing system is shown. The translating treatment cartridge 14 again has the first body portion 26 and the second body portion 28 as noncircular cross sections to prevent rotation about the central axis. As with the previous embodiment, the first and second body portions (26, 28) could have various cross sectional shapes such as an ellipse, an oval, a square, a rectangle, a hexagon, a polygon and each could be a different shape. In an embodiment, the first and second body portions are elliptical shaped with two axis of symmetry and having opposing larger radius sides 138 and an opposing smaller radius sides 140 as best seen in FIG. 24

Figure 26:
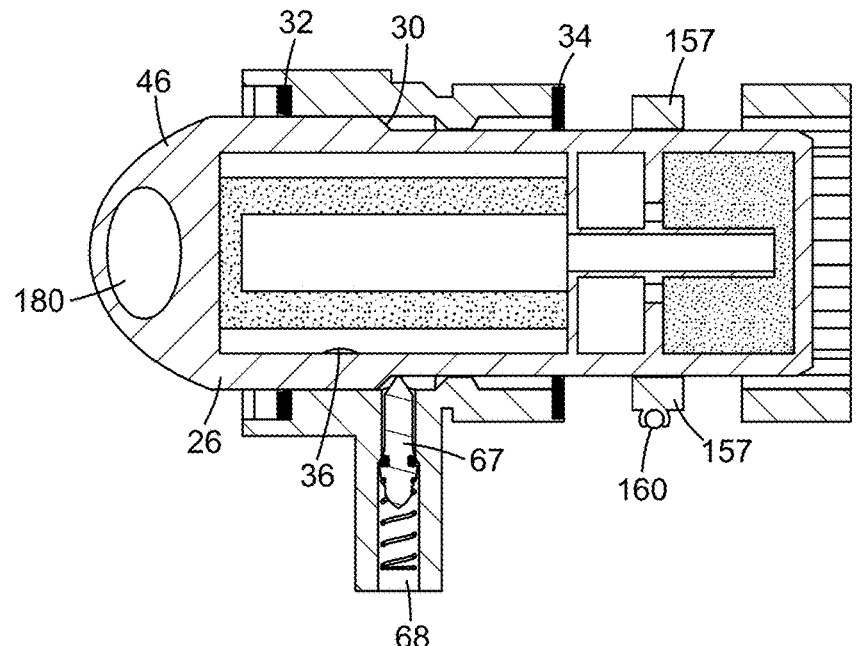
FIG. 26 illustrates a cross section taken along the central axis in the direction of 26-26 in FIG. 23.
Figure 27:
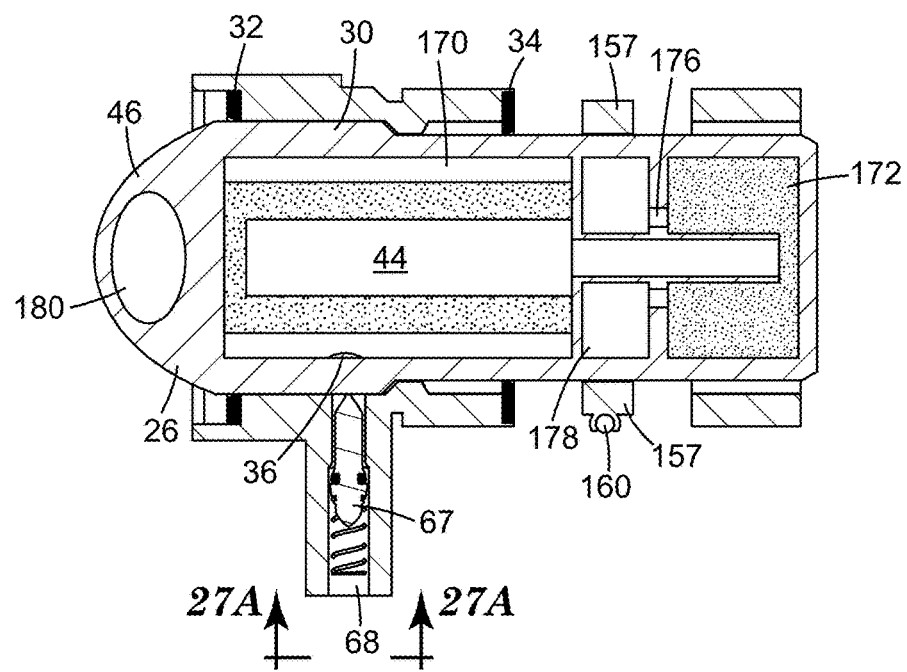
FIG. 27 illustrates a cross section taken along the central axis in the direction of 26-26 in FIG. 23 with the treatment cartridge translated partially into the manifold.

Also in this embodiment, the first and second sealing members (32, 34) comprise wiper seals and have been relocated to inside of the cartridge bore 66 adjacent the opposing ends of manifold 12 instead of being placed onto the first and second body portions (26, 28) as seen in FIG. 26. As such, the translating treatment cartridge 14 does not have any external sealing members on the housing 22 and can be more cost effectively manufactured since the wiper seals can be reused whenever a new translating treatment cartridge 14 is installed into the cartridge bore 66. Wiper seals or O-rings located in the manifold for sealing with the translating filter cartridge can be used in any of the embodiments described herein.

Figure 24A:
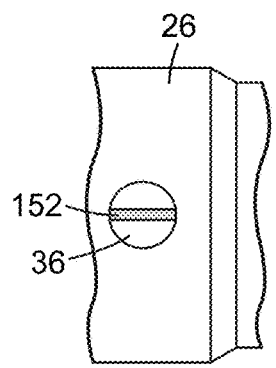
FIG. 24A illustrates the inlet orifice of the translating treatment cartridge.
Figure 27A:
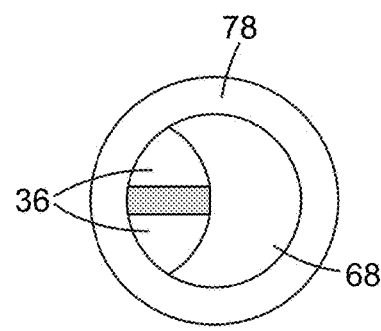
FIG. 27A illustrates a view through the inlet bore with the treatment cartridge partially translated by the dispensing lever into the manifold.

The inlet orifice 36 has been located on the first body portion 26 and further comprises a poppet valve bridge 152 spanning from one side of the inlet orifice to the opposite side of the inlet orifice bisecting the inlet orifice in two similar in appearance to the "no symbol" or the "do not enter" symbol as best seen in FIG. 24A. This inlet orifice allows 36 for variable flow dispensing. As best seen in FIG. 26 when the paddle end 60 of the dispensing lever 16 is pushed to the right, the translating treatment cartridge 14 engages the spring biased poppet valve 67 with the cam surface 30 opening the poppet valve. However, initially the inlet orifice 36 is partially or fully obscured by the cartridge bore 66 when the spring biased poppet valve 67 reaches the end of the cam surface 30. As such, very little fluid can flow through the translating treatment cartridge 14 and exit the dispending orifice 40 due to the fairly tight tolerance between the interior of the fitter bore 66 and the exterior of the first body portion 26. As the translating treatment cartridge 14 is moved further into the cartridge bore 66 by the dispensing lever 16, the spring biased poppet valve is continued to be held open by the poppet valve bridge 152 and the inlet orifice 36 is brought into partial alignment with the inlet bore 68 as best seen in FIG. 27A (spring biased poppet valve 67 removed from the inlet bore 68 for clarity). As the translating treatment cartridge 14 is moved farther into the inlet bore 66 by the dispensing lever 16, a progressively larger and larger amount of the inlet orifice 36 is uncovered and the flow of water through the inlet orifice 36 increases progressively. When the dispensing lever 16 reaches its maximum travel, the inlet orifice 36 and inlet bore 68 are concentrically aligned and maximum flow through the translating treatment cartridge is achieved as best seen in FIG. 24A. The poppet valve bridge 152 can span only a portion of the inlet orifice such that it is cantilevered from one side thereby blocking only a portion of the inlet orifice allowing for increased fluid flow with reduced pressure drop at the fully open position.

Figure 25:
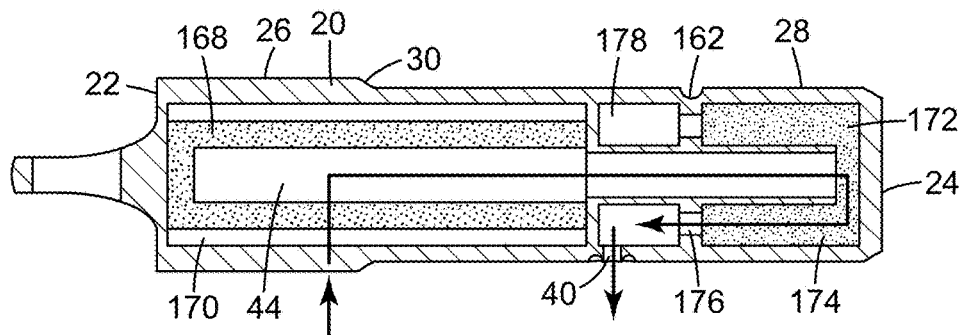
FIG. 25 illustrates a cross section taken along the central axis in the direction of 25-25 in FIG. 24.

As best seen in FIG. 25, the second body portion 28 of the translating treatment cartridge is made longer than in the embodiment of FIG. 5 and is supported outside of the cartridge bore 66 in the fully installed position by a treatment cartridge support 154 attached to the distal end of a treatment cartridge support arm 156 extending from the back of the manifold 12 and attached to the exterior surface 80. The treatment cartridge support 154 can be a hoop, or arm that partially or fully encircles the second body portion 28. Optionally it may include longitudinal ribs 74 and longitudinal grooves 76 to reduce friction.

Figure 22:
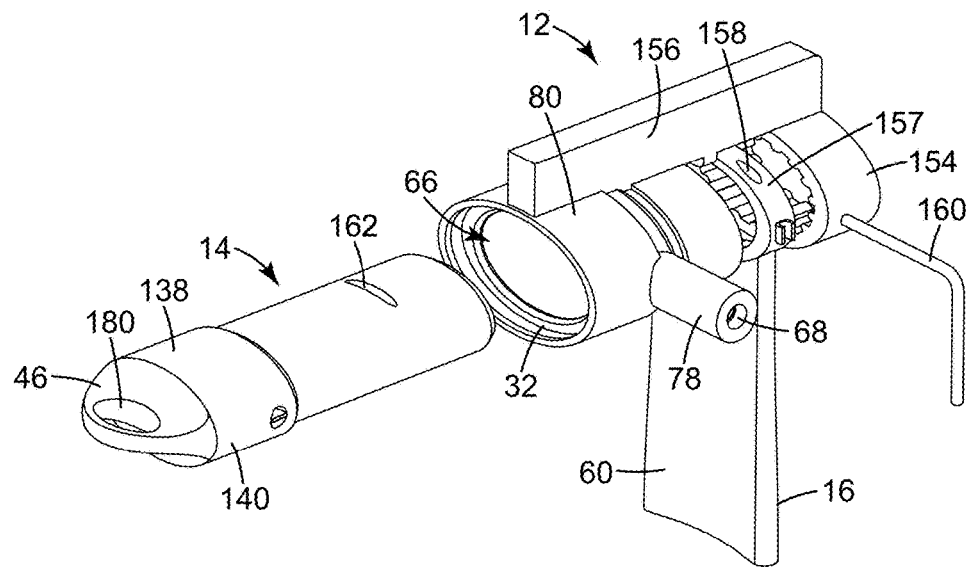
FIG. 22 illustrates an exploded perspective view of a sixth embodiment of a translating treatment cartridge and manifold.
Figure 23:
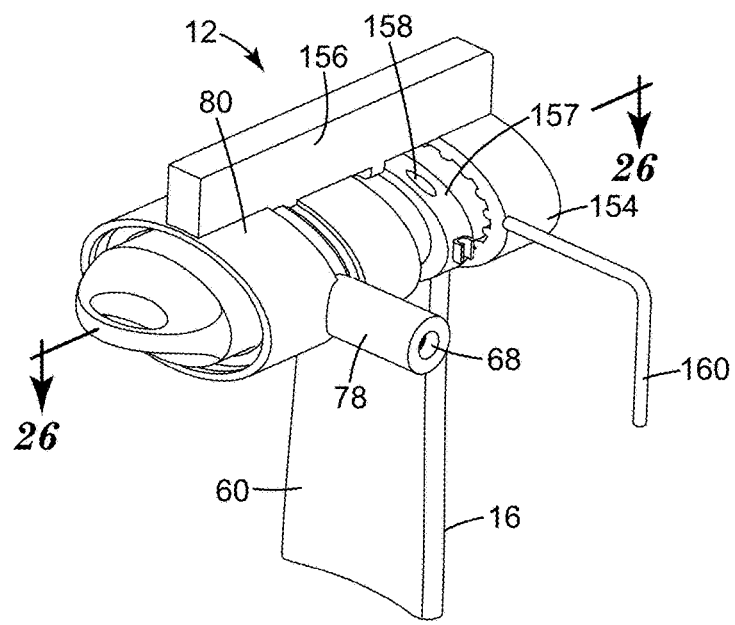
FIG. 23 illustrates a perspective view of the translating treatment cartridge and manifold of FIG. 22.

As seen in FIG. 22, the dispensing lever 16 comprises a paddle end 60 and a cartridge bore end 157 that partially or fully encircles the second body portion 28. The cartridge bore end 157 further includes a transverse retaining pin hole 158 sized for a slight interference fit with a retaining pin 160. The transverse retaining pin hole 158 is positioned such that when the retaining pin 160 is located in the transverse retaining pin hole a portion of the retaining pin traverses through the open cartridge bore end 157 to engage with a transverse retaining pin slot 162 forming the dispensing lever engagement feature 48 located on the second end 28. If desired this dispensing lever engagement feature and treatment cartridge support can be used with any of the embodiments described herein.

Thus, to install the translating treatment cartridge 14, the second end 24 is aligned with the inlet bore 66, the filter is pushed into the inlet bore until it clears the inlet bore 66. The dispensing lever 16 is positioned between the manifold 12 and the treatment cartridge support 154 and the second end 24 is pushed through the cartridge bore end 157 of the dispensing lever 16. The transverse retaining pin slot 162 is aligned with the transverse retaining pin hole 158 and the retaining pin 160 is inserted to secure the dispensing lever 16 to the second body portion 28. Thereafter, since the dispensing lever is positioned between the manifold 12 and the treatment cartridge support 154 encircling the second body portion 28, the translation of the treatment cartridge 14 is fixed between two stops. The inlet orifice 36 and cam surface 30 is positioned such that with the dispensing lever fully to the left the spring biased poppet valve is fully seated and with the dispensing lever 16 fully to the right, the spring biased poppet valve is positioned on the poppet valve bridge 152 and the inlet orifice 36 and inlet bore 68 are concentrically aligned for maximum flow.

Referring now to FIG. 25 further details of the translating treatment cartridge 14 is shown. A first treatment media 168 such as a carbon block is located within the housing 20 in a first filter chamber 170. The fluid enters from the inlet orifice 36 and fills first chamber 170, passes through the first treatment media 168 (carbon block) into a center channel 44 and flows towards the second end 24 and into a second chamber 172 containing a second treatment media 174 such as a ion exchange resin. The fluid then continues through a passage 176 into a third chamber 178. The dispensing orifice 40 is located on the second body portion 28 and passes through the housing 22 and into the third chamber.

As described with other embodiments, translation of the treatment cartridge 14 within the cartridge bore 12 of the manifold actuates the fluid flow and controls the position of spring biased poppet valve 67 via the cam surface 30 to dispense fluid from dispensing orifice 40 after passing through the first and the second treatment media (168, 170). An optional handle 46 can be provided with a finger hole 180 to assist in handling the cartridge or to optionally hang the translating treatment cartridge 14 for display purposes at the point of sale. A handle hole can be provided on any of the embodiments described herein.

Referring now to FIGS. 28-34 a seventh embodiment for the dispensing system is illustrated. The main features of this embodiment include a cam surface 30 on a projection from the housing 20, a different dispensing lever engagement feature 48, first and second sealing members (32, 34) positioned inside of the manifold 12 instead of on the translating treatment cartridge, cartridge tracking slots in the inlet bore 66 and cartridge indexing projections on the translating treatment cartridge. The cartridge tracking slot and cartridge indexing projections guide and restrict rotation of the translating treatment cartridge within the manifold 12.

Figure 29:
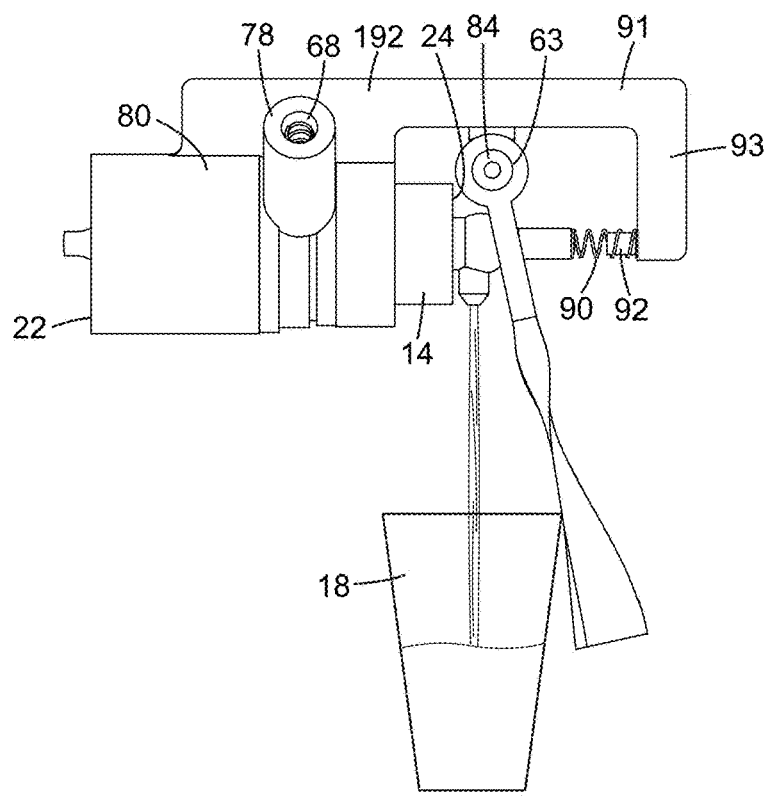
FIG. 29 illustrates a side view of the dispensing system of FIG. 28 dispensing water into a drinking glass.

The main components of the dispensing system include a manifold 12, a translating treatment cartridge 14, and a dispensing lever 16. As best seen in FIG. 29, placing a glass 18 under the translating treatment cartridge 14 and pushing the dispensing lever 16 to the right slides the translating treatment cartridge linearly within the manifold 12 causing a cam surface 30 on the treatment cartridge's exterior to actuate a spring biased poppet valve 67 sending water from the poppet valve though the treatment cartridge, out the integrated dispensing orifice 40, and into the glass.

Figure 32:
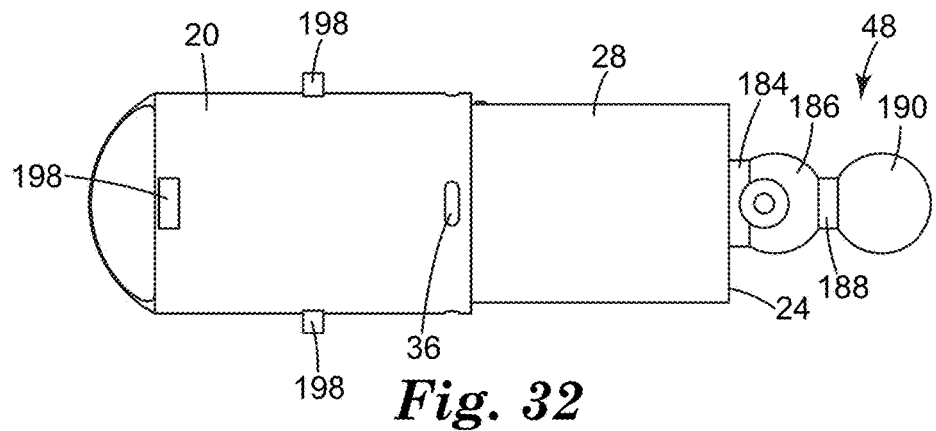
FIG. 32 illustrates a bottom view of the translating treatment cartridge of FIG. 28.
Figure 34:
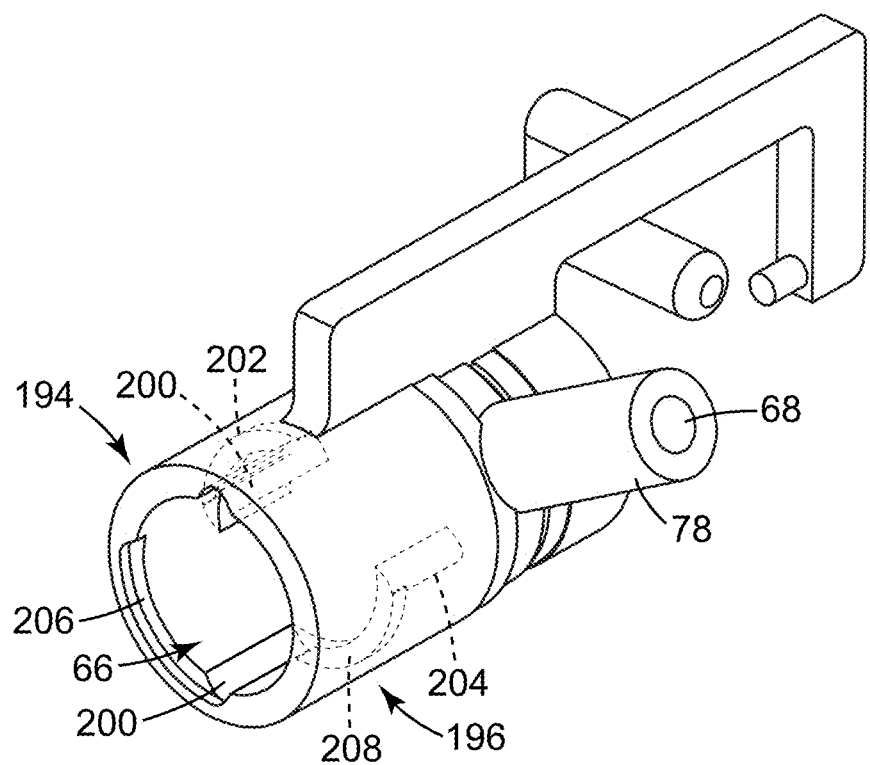
FIG. 34 illustrates a phantom perspective view of the manifold of FIG. 28 illustrating cartridge tracking slots.

Referring now to FIGS. 32 and 34, the translating treatment cartridge 14 includes the housing 20 having the first end 22, the second end 24, the first body portion 26, the second body portion 28, and the cam surface 30 located on a cam projection 182 extending from the second body portion 28. This cam surface feature can be used on any of the embodiments described herein. In various embodiments, the cam surface 30 is located within the middle half of the translating treatment cartridge's overall length. In another embodiment, the cam projection can instead be located on the first body portion 26.

In this embodiment, the first and second sealing members (32, 34) are located in the cartridge bore 66 on either side of the inlet bore end 24. The sealing members are provided in the manifold 12 and the exterior surface of the housing 20 engages the fluid seals while allowing for linear translation of the treatment cartridge 14. The sealing members can be O-rings disposed in grooves in the manifold 12 or wiper seals as previously described. This sealing method can be used on any of the embodiments described herein.

In this embodiment, the cartridge inlet orifice 36 is located in the first body portion 26 but can be positioned in the second body portion 28, a face 210, or combinations thereof, and is located to be between the first and second sealing members (32 and 34) and though the exterior surface of the housing 20 when the translating treatment cartridge 14 is installed into the manifold 12. In various embodiments, the cartridge inlet orifice 36 can be located within the middle half of the translating treatment cartridge's overall length. Multiple inlet orifices can be provided to enhance fluid flow.

Figure 30:
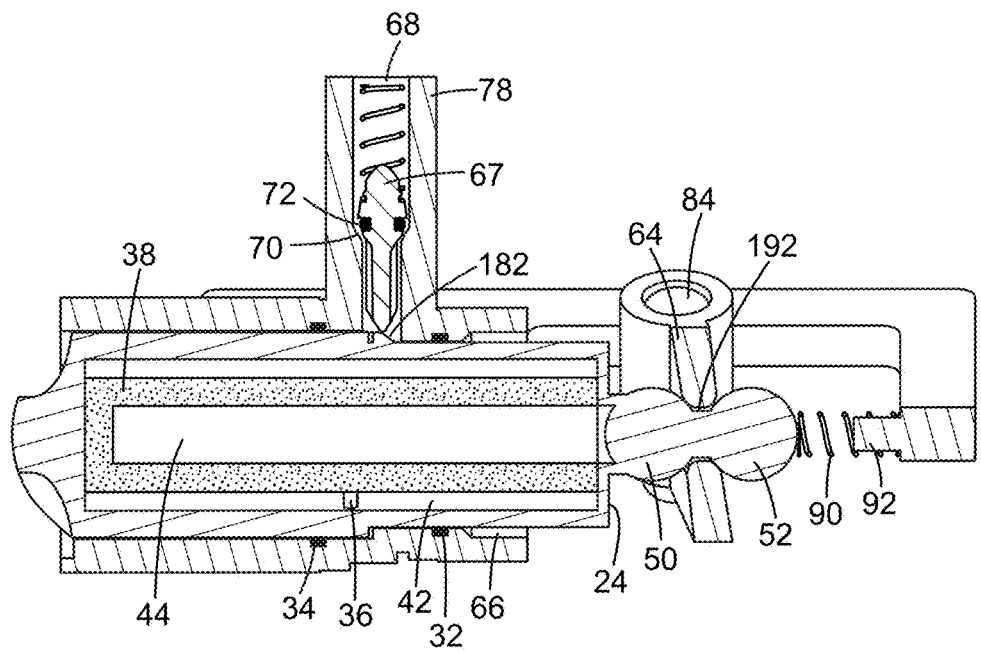
FIG. 30 illustrates a cross section taken along line 30-30 in FIG. 28.
Figure 31:
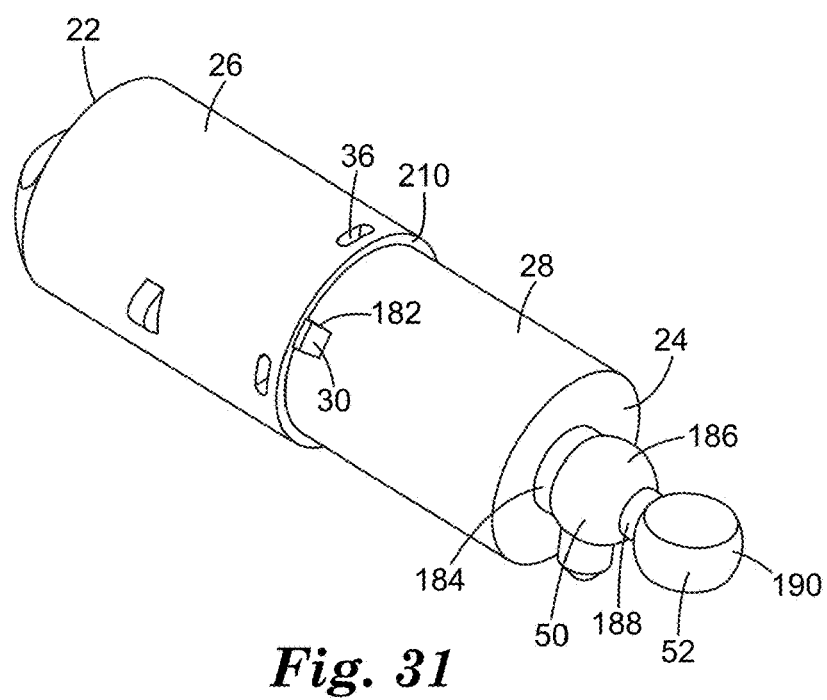
FIG. 31 illustrates a perspective view of the translating treatment cartridge of FIG. 28.

Referring now to FIG. 30, the treatment media 38 such as a carbon block is located within the housing 20 such that fluid entering the cartridge inlet orifice 36 passes through the treatment media 38 and out the dispensing orifice 40 located on the second end 24. In other embodiments, the dispensing orifice 40 can be located in the first end 22, the first body portion 26, the second body portion 28, or another portion of the housing 20 as discussed later. The fluid enters one or more cartridge inlet orifice(s) 36 and fills the outer chamber 42 within the housing 20, passes through the treatment media 38 (carbon block) into the center channel 44, flows towards the second end 24 and out the dispensing orifice 40 located on the second end 24. In some embodiments, the dispensing orifice 40 is placed on a 90 degree elbow such that the fluid is dispensed substantially perpendicular to a central axis line 6-6 of the treatment cartridge extending from the first end 22 to the second end 24.

In some embodiments, the first body portion 26 has a larger cross sectional area than the second body portion 28. In some embodiments, the first and second body portions are cylindrical and the first body portion has a larger diameter than the second body portion. By providing different cross sectional areas, it can be easier to insert the translating treatment cartridge 14 into the manifold 12 and provide a larger face 210 such that the hydraulic pressure will tend to shut off the fluid flow and push the translating treatment cartridge back into the manifold as previously described.

In some embodiments, a cartridge handle 46 is provided on the first end 22 for ease of rotating the translating treatment cartridge 14 when installing it into the manifold 12. In some embodiments a dispensing lever engagement feature 48 is provided on the second end 24.

Figure 28:
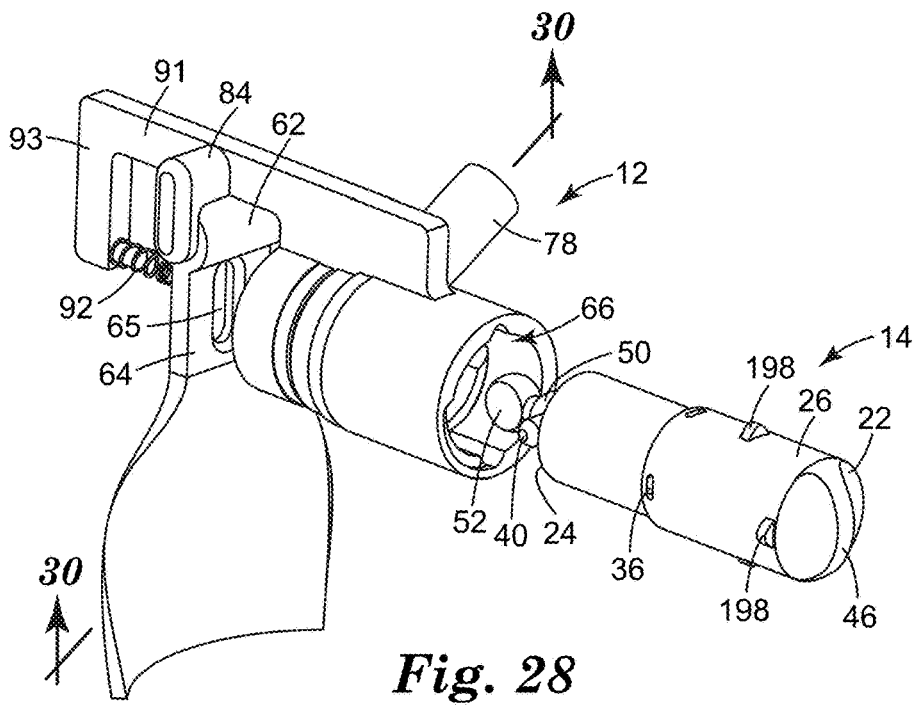
FIG. 28 illustrates an exploded perspective view of a seventh embodiment of a translating treatment cartridge and manifold.

In this embodiment, the dispensing lever engagement feature 48 comprised a first projection 50 extending from the second end 24 and a second projection 52 extending from the first projection 50. The first projection 52 includes a first cylindrical portion 184 attached to the second end 24 to space the dispensing orifice 40 away from the second end and a first convex portion 186 on attached to the cylindrical portion 184. The convex portion can be partially spherical to accommodate rotational motion of the dispensing lever 16. The second projection 52 includes a second cylindrical portion 188 attached to the first convex portion 186 to provide spacing for the slotted portion 64 of the dispensing lever 16 and a second convex portion 190, which can be a planer section of a sphere. The second convex portion has a width greater than its thickness such that it can be inserted through the slot 65 and once rotated 90 degrees captures the slot causing serious water damaged portion 64 between the first and second projections (50, 52). As best seen in FIG. 30, the convex surfaces of the first and second projections in combination with a convex radius 192 for the edges of the slot 65 ensures smother operation of the dispensing lever 16 as the treatment cartridge 14 is translated. This dispensing lever engagement feature can be used with any embodiment described herein. As seen in FIG. 28, the dispensing lever 16 comprised the paddle end 60, the bushing end 62 having the bore 63 and the slotted portion 64 having the through slot 65 connecting the bushing end to the paddle end.

Referring now to FIGS. 29 and 30, when the paddle end 60 of the dispensing lever 16 is pushed to dispense water it pivots about the bushing end 62 and pulls the translating treatment cartridge 14 further into the manifold 12 engaging the cam surface 30 with a spring biased poppet valve 67 located in an inlet bore 68 in the manifold 12. The spring biased poppet valve 67 is translated linearly away from its valve seat 70 by the cam surface 30 as the treatment cartridge is translated linearly farther into the manifold to allow water to flow past the valve seat 70 and into the cartridge inlet orifice 36 of the translating treatment cartridge 14. The spring biased poppet valve 67 can include an optional O-ring 72 for enhanced sealing with the valve seat 70. Thus, until the dispensing lever 16 is pushed and the spring biased poppet valve 67 is moved away from its valve seat 70, there is no pressure on any fluid remaining inside the housing 12 since the dispensing orifice 40 is open to atmosphere. As such, the housing 12 can be made from thinner or cheaper materials which may not be suitable for use as a pressure vessel or as freeze tolerant if the treatment cartridge was located near the freezer compartment.

The manifold 12 includes the cartridge bore 66, which in some embodiments is reduced or stepped in cross sectional area to correspond with the first and second body portions (26, 28) as shown in FIG. 30. The cartridge bore 66 can comprise optional longitudinal ribs 74 and longitudinal grooves 76 to reduce frictional contact between the cartridge bore 66 and the first and second body portions (26, 28) as done for the embodiment of FIG. 1. The manifold further includes, an inlet projection 78 extending from an outer surface 80 having the inlet bore 68 housing the spring biased poppet 67 valve and valve seat 70. Since the dispensing orifice 40 is in the translating treatment cartridge's housing 22, the manifold 12 in many embodiments does not have a fluid outlet or provision for connection of a fluid outlet.

Figure 33:
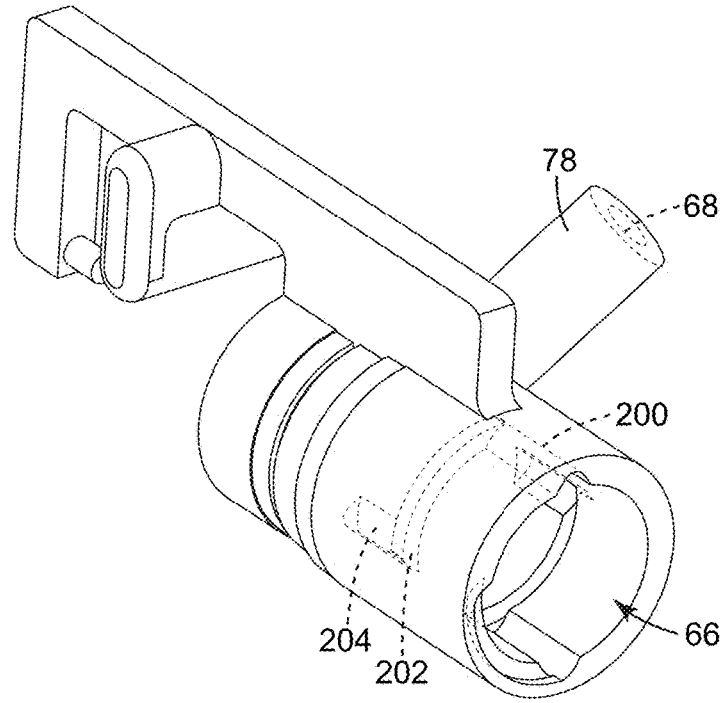
FIG. 33 illustrates a phantom perspective view of the manifold of FIG. 28 illustrating cartridge tracking slots.

As best seen in FIGS. 32, 33 and 34, the manifold 12 includes a first cartridge tracking slot 194 and a second cartridge tracking slot 196 in the inlet bore 66 and the cartridge has three cartridge indexing projections 198 on the first body portion 26 positioned at 90, 180, and 270 degrees on the translating treatment cartridge. The cartridge tracking slots and cartridge indexing projections guide and restrict rotation of the translating treatment cartridge within the manifold 12. In some embodiments, only a single cartridge indexing projection and a single cartridge tracking slot can be used. The cartridge indexing projections can be pins, triangles, spherical, cone, ellipsoid, hook, J-shaped or Y-shaped.

The first and second cartridge indexing slots (194, 196) include at least a liner portion aligned parallel to the cartridge bore 66 and an arcuate portion around the circumference of the cartridge bore 66. The first cartridge indexing slot 194 in the direction of filter insertion includes a first linear portion 200 extending to an arcuate portion 202 extending around the circumference of the cartridge bore 66 and joined to a second linear portion 204 ending near the first sealing member 32. The second cartridge indexing slot 196 in the direction of filter insertion includes a first arcuate portion 206 extending to a first linear portion 200 extending to a second arcuate portion 208 extending around the circumference of the cartridge bore 66 joined to a second linear portion 204 ending near the first sealing member 32.

During dispensing, one of cartridge indexing projections 198 translates in the second linear portion 204 of the first cartridge indexing slot 194, one of the cartridge indexing projections 198 translates in the second linear portion of the 204 of the second cartridge indexing slot 196, and one of the cartridge indexing pins 198 translates in the first linear portion 200 of the second cartridge indexing slot 196. As such, the treatment cartridge once fully installed is unable to rotate within the cartridge bore 66 when fully installed.

To insert the translating treatment cartridge 14, the opposing cartridge indexing projections 198 are aligned with the first linear portions 200 as best seen in FIG. 28. The translating treatment cartridge 14 is slide into the cartridge bore 66 until the cartridge indexing projections 198 reach the arcuate portions of the first and second cartridge indexing slots (194, 196) which allow the filter to be rotated 90 degrees. Simultaneously the second projection 52 is passed through the slot 65 of the dispensing lever 16 and it becomes captured after the treatment cartridge is rotated. The length of the second linear portions 204 provide end stops to control the linear translation of the treatment cartridge within the cartridge bore 66 from the neutral or off position to the full dispensing position.

The above features using indexing projections and slots can be used on any of the embodiments herein where the treatment cartridge is able to rotate within the cartridge body of the manifold. The number of indexing projections and geometry of the slots can be varied so as to prevent rotational or linear translation at different points along the cartridge bore.

Extending longitudinally from the outer surface 80 is a dispensing lever spring return arm 192. The dispensing lever spring arm 192 is generally "L" shaped with the long arm portion 91 of the L attached to the exterior surface 80 of the manifold 12 and the distending short arm portion 93 of the L spaced apart from the second projection 52 on the second end 24 of the translating treatment cartridge 14. A spring support projection 92 extends from the short arm portion 93 back toward the first end 24 of the translating treatment cartridge 14 and the cartridge return spring 90 is captured on the spring support projection 92. The dispensing lever spring arm 192 includes a distending transverse pin 84 located on the long arm portion 91 for engagement with the bushing end 62 of the dispensing lever 16. A dispensing lever retainer such as a c-clip, cotter pin, push nut, nut, screw, snap fit, press fit, or other suitable fastener or method can optionally be positioned on the distal end of the distending transverse pin 84 to retain the bushing end 62 on the transverse pin if desired. The cartridge return spring 90 returns the translating treatment cartridge 14 to the off or neutral position when the dispensing lever 16 is released such that the flow of fluid from the dispensing orifice 40 is stopped.

As discussed, the manifold 12 and translating treatment cartridge 14 together act like a hydraulic spool valve with the translating treatment cartridge 14 acting like a spool within the manifold 12 such that translation of the treatment cartridge controls the flow of fluid out of the manifold 12, into the translating treatment cartridge 14, and out of the dispensing orifice 40. As such, at least one of the first and second body portions (26 and 28) or both comprise a linear bearing surface and at least a portion of the cartridge bore 66 comprises a bushing such that the translating treatment cartridge 14 is supported for linear motion within the manifold during use.

Since the translating treatment cartridge 14 acts as a translating spool a significant portion of its overall length, L, is contained within the cartridge bore 66 as seen in the various embodiments. As such, in some embodiments, at least 30, 40, 50, 60, 70, 80, or 90% of the length of the first or the second body portion (26, 28) can be contained within the inlet bore 66 when the translating treatment cartridge is not dispensing fluid. In other embodiments, at least 30, 40, 50, 60, 70, 80, or 90% of the length of the first and second body portions (26, 28) can be contained within the cartridge bore 66 when the translating treatment cartridge is not dispensing fluid.

Typical materials for forming the housing and manifold include plastics, metals, or other materials capable of retaining the necessary shapes under the expected system forces as known those of skill in the fluid treatment art. Typical materials for the treatment media include carbon, granular resins, membranes, nonwovens, filtering media, or additives as known to those of skill in the fluid treatment art. The treatment cartridge may also treat the fluid by heating, cooling, UV light, or carbon dioxide addition thus a media is not strictly necessary in any embodiments described as including a treatment media.

Various features of the dispensing system 10 have been illustrated by various embodiments. The feature(s) of any one embodiment can be added to or removed from any other embodiment. For example, the feature of dual dispensing is shown in the embodiment of FIG. 8; however, that feature could be added to any of the other embodiments shown. As another example, the dispensing lever shown in FIG. 22 or the push button feature of FIG. 7 could be used on any of the embodiments. Switching of other features such as sealing member locations, dispensing orifice location, inlet orifice design, etc. can be done as well.

In other embodiments, the translating filter cartridge can be arcuate like a banana and the cartridge bore can have a corresponding actuate shape such that curvilinear as opposed to pure linear motion is used to actuate the water supply through the cartridge. The inlet orifice and poppet valve can be disposed at an angle other than 90 degrees to the exterior surface of the manifold. The filter cartridge could be cone shaped or tapered along any portion or from the first end to the second end. Thus, the cam surface could simply be the exterior surface of the cartridge that is gradually tapered.

EMBODIMENTS OF THE INVENTION

System Embodiments

1. A dispensing system comprising:
   a manifold having a fluid inlet and a cartridge bore;
   a translating treatment cartridge in the cartridge bore; and
   wherein motion of the translating treatment cartridge from a first position to a dispensing position within the cartridge bore dispenses fluid from a dispensing orifice located in the translating treatment cartridge.
2. The dispensing system of embodiment 1 wherein the fluid inlet comprises an inlet bore, a valve seat located in the inlet bore, and a spring biased poppet valve located within the inlet bore.
3. The dispensing system of embodiment 1 or 2 wherein the manifold does not have a fluid outlet.
4. The dispensing system of embodiment 1 or 2 wherein the manifold comprises an auxiliary outlet port.
5. The dispensing system of embodiment 4 wherein the manifold comprises a solenoid valve and a second fluid inlet.
6. The dispensing system of embodiment 1 wherein the cartridge bore comprises longitudinal ribs and longitudinal grooves spaced around the circumference of the cartridge bore.
7. The dispensing system of embodiment 1 wherein the cartridge bore comprises a non-circular cross section.
8. The dispensing system of embodiment 7 wherein the cartridge bore comprises an elliptical cross section, the elliptical cross section having two axes of symmetry, opposing larger radius sides, and opposing smaller radius sides.
9. The dispensing system of embodiment 7 where cartridge bore comprises an oval cross section, the oval cross section having one axis of symmetry and a larger radius side opposing a smaller radius side.
10. The dispensing system of embodiment 1 wherein the cartridge bore comprises a first sealing member spaced longitudinally from a second sealing member and the fluid inlet is located between the first and the second sealing members.
11. The dispensing system of embodiment 10 wherein the first and second sealing members comprise wiper seals.
12. The dispensing system of embodiment 1 or 2 wherein the translating treatment cartridge comprises a housing having a first end, a second end, a first body portion, a second body portion, and a cam surface located between the first and second body portions.
13. The dispensing system of embodiment 12 wherein the first body portion has a larger cross sectional area than the second body portion, the cam surface comprises a chamfer between the first body portion and the second body portion, and the cartridge bore is stepped in cross sectional area to correspond with the first and second body portions.
14. The dispensing system of embodiment 12 wherein the cartridge bore comprises a cartridge tracking slot and the translating treatment cartridge comprises a cartridge indexing projection extending from the housing, and wherein the cartridge indexing projection resides in the cartridge tracking slot for at least a portion of the linear motion to prevent rotation of the translating treatment cartridge.
15. The dispensing system of embodiment 14 wherein the cartridge tracking slot comprises a linear portion aligned parallel to the cartridge bore and an arcuate portion extending along the circumference of the cartridge bore.
16. The dispensing system of embodiment 15 wherein the cartridge tracking slot in the direction of insertion of the translating treatment cartridge comprises a first linear portion extending to an arcuate portion extending along the circumference of the cartridge bore to a second linear portion.
17. The dispensing system of embodiment 16 comprising a second cartridge indexing slot and wherein the second cartridge indexing slot in the direction of insertion of the translating treatment cartridge comprises a first arcuate portion extending along the circumference of the cartridge bore to a first linear portion extending to a second arcuate portion extending around the circumference of the cartridge bore to a second linear portion.
18. The dispensing system of embodiment 12 wherein at least one of the first or second body portions comprises a linear bearing surface and at least a portion of the filter inlet bore comprises a bushing.
19. The dispensing system of embodiment 1 comprising:
   a treatment cartridge spring return arm having an L shape with a long arm portion attached to the manifold and a distending short arm portion spaced apart from the translating treatment cartridge;
   a spring support projection extending from the short arm portion back toward the translating treatment cartridge; and
   a cartridge return spring captured on the spring support projection positioning the cartridge return spring between the translating treatment cartridge and the distending short arm.
20. The dispensing system of embodiment 1 comprising:
   a dispensing lever comprising a paddle end, a bushing end, and a slotted portion connecting the paddle end to the bushing end;

the translating treatment cartridge comprising a dispensing lever engagement feature connected to the slotted portion of the dispensing lever; and
the manifold comprising a longitudinally extending dispensing lever support arm connected to the manifold, the dispensing lever support arm comprising a distending transverse pin; and the bushing end of the dispensing lever positioned on the distending transverse pin.

21. The dispensing system of embodiment 20 wherein the manifold comprises a spool housing having a hollow center section and at least one flange extending from the hollow center section, and the at least one flange having a circular slot with the longitudinally extending dispensing lever support arm passing through the circular slot.

22. The dispensing system of embodiment 1 comprising a dispensing lever having a paddle end and a cartridge bore end, and wherein the translating treatment cartridge extends through the cartridge bore end.

23. The dispensing system of embodiment 22 wherein the manifold comprises a treatment cartridge support arm extending from the manifold and a treatment cartridge support attached to the distal end of the treatment cartridge support arm, and wherein the translating treatment cartridge extends to the treatment cartridge support and the dispensing lever is positioned between the treatment cartridge support and the cartridge bore of the manifold.

24. The dispensing system of embodiment 1 comprising:
a dispensing lever comprising a paddle end, a bushing end, and a slotted portion connecting the paddle end to the bushing end;
the translating treatment cartridge comprising a dispensing lever engagement feature connected to the slotted portion of the dispensing lever;
a dispensing lever spring return arm having an L shape with a long arm portion attached to the manifold and a distending short arm portion spaced apart from the translating treatment cartridge;
a spring support projection extending from the short arm portion back toward the translating treatment cartridge;
a cartridge return spring captured on the spring support projection positioning the cartridge return spring between the dispensing lever and the distending short arm; and
a distending transverse pin attached to the long arm portion positioned between the cartridge bore and the distending short arm, and the bushing end of the dispensing lever positioned on the distending transverse pin.

Method Embodiments

1. A method of dispensing a fluid comprising:
positioning a translating treatment cartridge having a housing with an inlet orifice and a dispensing orifice into a manifold, the manifold having a cartridge bore surrounding a central axis of the manifold and a fluid inlet;
moving the translating treatment cartridge linearly along the central axis from a first position to a dispensing position causing the fluid to flow from the fluid inlet, though the inlet orifice, through the translating treatment cartridge, and out the dispensing orifice.

2. The method of embodiment 1 comprising moving the translating treatment cartridge from the dispensing position to the first position stopping the flow of fluid from the dispensing orifice.

3. The method of embodiment 1 or 2 comprising biasing the translating treatment cartridge to return to the first position.

4. The method of embodiment 1 or 2 wherein the fluid inlet comprises an inlet bore, a valve seat located in the inlet bore, and a spring biased poppet valve located within the inlet bore; the translating treatment cartridge comprises a cam surface located on the housing; and wherein the spring biased poppet valve is seated against the valve seat in the first position, and the cam surface opens the spring biased poppet valve in the dispensing position.

5. The method of embodiment 1 wherein the positioning comprises inserting an end of the translating treatment cartridge through the cartridge bore and engaging a dispensing lever with a dispensing lever engagement feature located on the translating treatment cartridge.

6. The method of embodiment 5 wherein engaging the dispensing lever comprises rotating the translating treatment cartridge about the central axis.

7. The method of embodiment 6 comprising passing a portion of the dispensing lever engagement feature though a slotted portion of the dispensing lever prior to rotating the translating treatment cartridge.

8. The method of embodiment 6 wherein the rotation rotates the translating treatment cartridge within the cartridge bore.

9. The method of embodiment 6 wherein the rotation rotates the cartridge bore and manifold about the central axis.

10. The method of embodiment 5 comprising passing the end of the translating treatment cartridge through a cartridge bore end of the dispensing lever.

11. The method of embodiment 5 comprising moving the dispensing lever causing the translating treatment cartridge to move linearly along the central axis.

12. The method of embodiment 11 wherein the moving comprises pushing on the dispensing lever with a glass and dispensing the fluid from the dispensing orifice into the glass.

13. The method of embodiment 1 or 2 comprising retracting the dispensing orifice into the cartridge bore when the translating treatment cartridge is in the first position.

14. The method of embodiment 13 comprising aligning the dispensing orifice with an auxiliary port in the manifold when the translating treatment cartridge is in the first position.

15. The method of embodiment 14 comprising activating a solenoid valve causing the fluid to flow from a second fluid inlet in the manifold, through the translating treatment cartridge, out the dispensing orifice, and into the auxiliary port.

16. The method of embodiment 1 wherein the translating treatment cartridge comprises:
a first dispensing orifice and a second dispensing orifice; and
wherein moving the translating treatment cartridge linearly along the central axis comprises:
moving from the first position in a first direction to a first dispensing position causes the fluid to flow from the fluid inlet, though the inlet orifice, through the translating treatment cartridge, and out the first dispensing orifice; and
moving from the first position in a second direction to a second dispensing position causes the fluid to flow from the fluid inlet, though the inlet orifice, through the translating treatment cartridge, and out the second dispensing orifice.

17. The method of embodiment 16 wherein the positioning comprises inserting an end of the translating treatment cartridge through the cartridge bore and engaging a dispensing lever with a dispensing lever engagement feature located on the translating treatment cartridge.
18. The method of embodiment 17 wherein pushing on the dispensing lever causes the fluid to be dispensed from the first dispensing orifice.
19. The method of embodiment 17 wherein pulling on the dispensing lever causes the fluid to be dispensed from the second dispensing orifice.
20. The method of embodiment 16 comprising biasing the translating treatment cartridge to return to the first position.
21. The method of embodiment 1 wherein moving the translating treatment cartridge linearly along the central axis from the first position towards the dispensing position varies the fluid flow from the dispensing orifice, and the fluid flow increases the farther the translating treatment cartridge is moved away from the first position until a maximum flow is obtained when the translating treatment cartridge is in the dispensing position.

Cartridge Embodiments

1. A translating treatment cartridge comprising:
   a housing having a first end, a second end, a central axis extending from the first end to the second end, a first body portion surrounding the central axis, a second body portion surrounding the central axis, and a cam surface located on the housing;
   the first body portion having a larger cross sectional area than the second body portion;
   a cartridge inlet orifice located in the first body portion or the second body portion;
   a treatment media contained within the housing; and
   a dispensing orifice located in the housing.
2. The translating treatment cartridge of embodiment 1 comprising a first sealing member on the first body portion, a second sealing member on the second body portion, and the cam surface and the cartridge inlet orifice are both positioned between the first and the second sealing members.
3. The translating treatment cartridge of embodiment 2 wherein the first and second sealing members comprise O-rings and the first sealing member is disposed in an O-ring groove circumscribing the first body portion and the second sealing member is disposed in an O-ring groove circumscribing the second body member.
4. The translating treatment cartridge of embodiment 1 or 2 wherein the cam surface comprises a chamfer between the first body portion and the second body portion.
5. The translating treatment cartridge of embodiment 1 or 2 comprising a cam projection extending from the second body portion and the cam surface is located on the cam projection.
6. The translating treatment cartridge of embodiment 1 or 2 wherein the cam surface comprises a first cam surface located between the first body portion and a valley, and a second cam surface located between the second body portion and the valley.
7. The translating treatment cartridge of embodiment 1 or 2 wherein the cartridge inlet orifice and the cam surface are both located within the middle half of an overall length of the translating treatment cartridge.
8. The translating treatment cartridge of embodiment 1 or 2 wherein the dispensing orifice dispenses in a direction perpendicular to the central axis.
9. The translating treatment cartridge of embodiment 8 comprising a nozzle attached to the second end and the dispensing orifice is located in the nozzle.
10. The translating treatment cartridge of embodiments 8 comprising a first dispensing orifice in the first body portion and a second dispensing orifice in the second body portion.
11. The translating treatment cartridge of embodiment 1 or 2 wherein the first and the second body portions both comprise a non-circular cross section.
12. The translating treatment cartridge of embodiment 11 wherein the first and the second body portions both comprise an elliptical cross section, the elliptical cross section having two axes of symmetry, opposing larger radius sides, and opposing smaller radius sides.
13. The translating treatment cartridge of embodiment 11 wherein the first and the second body portions both comprise an oval cross section, the oval cross section having one axis of symmetry and a larger radius side opposing a smaller radius side.
14. The translating treatment cartridge of embodiment 1 or 2 wherein the cross sectional shape of the first body portion is different from the cross sectional shape of the second body portion.
15. The translating treatment cartridge of embodiment 1 or 2 wherein at least one of the first or the second body portions comprises a linear bearing surface for supporting the translating treatment cartridge along the central axis when positioned in a cartridge bore during linear motion within the cartridge bore of a corresponding manifold.
16. The translating treatment cartridge of embodiments 1 or 2 comprising a first inlet orifice in the first body portion and a second inlet orifice in the second body portion.
17. The translating treatment cartridge of embodiments 1 or 2 wherein the inlet orifice comprises a poppet valve bridge spanning from one side of the inlet orifice to the opposite side of the inlet orifice bisecting the inlet orifice in two.
18. The translating treatment cartridge of embodiments 1 or 2 comprising an cartridge indexing projection extending from the first or the second body portions.
19 The translating treatment cartridge of embodiment 18 comprising three cartridge indexing projections on the first body portion positioned at 90, 180, and 270 degrees around the first body portion of the translating treatment cartridge.
20. The translating treatment cartridge of embodiment 1 or 2 comprising a dispensing lever engagement feature extending from the second end.
21. The translating treatment cartridge of embodiment 20 wherein the dispensing lever engagement feature comprises, a first projection extending from the second end and a second projection extending concentrically along the central axis from the first projection having a smaller cross sectional area, a first pin extending radially from the distal end of the first projection and a second pin extending radially from the distal end of the second projection.
22. The translating treatment cartridge of embodiment 20 wherein the dispensing lever engagement feature comprises a projection extending from the second end along the central axis and a pin extending radially from the distal end of the first projection.
23. The translating treatment cartridge of embodiment 20 wherein the dispensing lever engagement feature comprises a transverse retaining pin slot on the second body portion and a dispensing lever comprising a paddle end and a cartridge bore end that partially or fully encircles the second body portion 28 is pinned on the second body portion by a retaining pin.

24. The translating treatment cartridge of embodiment 20 comprising a dispensing lever connected to the dispensing lever engagement feature extending from the second end.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A dispensing system comprising:
   a manifold having a fluid inlet and a cartridge bore;
   a translating treatment cartridge in the cartridge bore; and
   wherein motion of the translating treatment cartridge from a first position to a dispensing position within the cartridge bore dispenses fluid from a dispensing orifice located in the translating treatment cartridge, and wherein the translating treatment cartridge comprises a housing having a first end, a second end, a first body portion, a second body portion, and a cam surface located between the first and second body portions.

2. The dispensing system of claim 1 wherein the fluid inlet comprises an inlet bore, a valve seat located in the inlet bore, and a spring biased poppet valve located within the inlet bore.

3. The dispensing system of claim 1 wherein the manifold does not have a fluid outlet.

4. The dispensing system of claim 1 wherein the manifold comprises an auxiliary outlet port.

5. The dispensing system of claim 4 wherein the manifold comprises a solenoid valve and a second fluid inlet.

6. The dispensing system of claim 1 wherein the cartridge bore comprises longitudinal ribs and longitudinal grooves spaced around the circumference of the cartridge bore.

7. The dispensing system of claim 1 wherein the cartridge bore comprises a non-circular cross section.

8. The dispensing system of claim 7 wherein the cartridge bore comprises an elliptical cross section, the elliptical cross section having two axes of symmetry, opposing larger radius sides, and opposing smaller radius sides.

9. The dispensing system of claim 7 where cartridge bore comprises an oval cross section, the oval cross section having one axis of symmetry and a larger radius side opposing a smaller radius side.

10. The dispensing system of claim 1 wherein the cartridge bore comprises a first sealing member spaced longitudinally from a second sealing member and the fluid inlet is located between the first and the second sealing members.

11. The dispensing system of claim 10 wherein the first and second sealing members comprise wiper seals.

12. The dispensing system of claim 1 wherein the first body portion has a larger cross sectional area than the second body portion, the cam surface comprises a chamfer between the first body portion and the second body portion, and the cartridge bore is stepped in cross sectional area to correspond with the first and second body portions.

13. The dispensing system of claim 1 wherein the cartridge bore comprises a cartridge tracking slot and the translating treatment cartridge comprises a cartridge indexing projection extending from the housing, and wherein the cartridge indexing projection resides in the cartridge tracking slot for at least a portion of the linear motion to prevent rotation of the translating treatment cartridge.

14. The dispensing system of claim 13 wherein the cartridge tracking slot comprises a linear portion aligned parallel to the cartridge bore and an arcuate portion extending along the circumference of the cartridge bore.

15. The dispensing system of claim 14 wherein the cartridge tracking slot in the direction of insertion of the translating treatment cartridge comprises a first linear portion extending to an arcuate portion extending along the circumference of the cartridge bore to a second linear portion.

16. The dispensing system of claim 15 comprising a second cartridge indexing slot and wherein the second cartridge indexing slot in the direction of insertion of the translating treatment cartridge comprises a first arcuate portion extending along the circumference of the cartridge bore to a first linear portion extending to a second arcuate portion extending around the circumference of the cartridge bore to a second linear portion.

17. The dispensing system of claim 1 wherein at least one of the first or second body portions comprises a linear bearing surface and at least a portion of the filter inlet bore comprises a bushing.

18. The dispensing system of claim 1 comprising:
    a treatment cartridge spring return arm having an L shape with a long arm portion attached to the manifold and a distending short arm portion spaced apart from the translating treatment cartridge;
    a spring support projection extending from the short arm portion back toward the translating treatment cartridge; and
    a cartridge return spring captured on the spring support projection positioning the cartridge return spring between the translating treatment cartridge and the distending short arm.

19. The dispensing system of claim 1 comprising:
    a dispensing lever comprising a paddle end, a bushing end, and a slotted portion connecting the paddle end to the bushing end;
    the translating treatment cartridge comprising a dispensing lever engagement feature connected to the slotted portion of the dispensing lever; and
    the manifold comprising a longitudinally extending dispensing lever support arm connected to the manifold, the dispensing lever support arm comprising a distending transverse pin; and the bushing end of the dispensing lever positioned on the distending transverse pin.

20. The dispensing system of claim 19 wherein the manifold comprises a spool housing having a hollow center section and at least one flange extending from the hollow center section, and the at least one flange having a circular slot with the longitudinally extending dispensing lever support arm passing through the circular slot.

21. The dispensing system of claim 1 comprising a dispensing lever having a paddle end and a cartridge bore end, and wherein the translating treatment cartridge extends through the cartridge bore end.

22. The dispensing system of claim 21 wherein the manifold comprises a treatment cartridge support arm extending from the manifold and a treatment cartridge support attached to the distal end of the treatment cartridge support arm, and wherein the translating treatment cartridge extends to the treatment cartridge support and the dispensing lever is positioned between the treatment cartridge support and the cartridge bore of the manifold.

23. The dispensing system of claim 1 comprising:
   a dispensing lever comprising a paddle end, a bushing end, and a slotted portion connecting the paddle end to the bushing end;
   the translating treatment cartridge comprising a dispensing lever engagement feature connected to the slotted portion of the dispensing lever;
   a dispensing lever spring return arm having an L shape with a long arm portion attached to the manifold and a distending short arm portion spaced apart from the translating treatment cartridge;
   a spring support projection extending from the short arm portion back toward the translating treatment cartridge;
   a cartridge return spring captured on the spring support projection positioning the cartridge return spring between the dispensing lever and the distending short arm; and
   a distending transverse pin attached to the long arm portion positioned between the cartridge bore and the distending short arm, and the bushing end of the dispensing lever positioned on the distending transverse pin.

24. A dispensing system comprising:
   a manifold having a fluid inlet and a cartridge bore;
   a translating treatment cartridge in the cartridge bore; and
   wherein motion of the translating treatment cartridge from a first position to a dispensing position within the cartridge bore dispenses fluid from a dispensing orifice located in the translating treatment cartridge, and wherein the manifold does not have a fluid outlet.

* * * * *